(12) United States Patent
Maekawa et al.

(10) Patent No.: US 6,570,160 B1
(45) Date of Patent: May 27, 2003

(54) RADIATION DETECTING APPARATUS

(75) Inventors: Tatsuyuki Maekawa, Tokyo (JP); Akio Sumita, Yokohama (JP); Kazumi Watanabe, Tokyo (JP); Soichiro Morimoto, Yokohama (JP); Yoshiaki Ohara, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/472,210

(22) Filed: Dec. 27, 1999

(30) Foreign Application Priority Data

Dec. 28, 1998 (JP) .......................... 10-374060
Mar. 12, 1999 (JP) .......................... 11-066348

(51) Int. Cl.⁷ ................................................ G01T 1/20
(52) U.S. Cl. ...................................................... 250/367
(58) Field of Search ................................ 250/366, 367, 250/368

(56) References Cited

U.S. PATENT DOCUMENTS

| | | | | |
|---|---|---|---|---|
| 2,550,107 A | * | 4/1951 | Coltman | 250/363.01 |
| 2,910,592 A | * | 10/1959 | Armistead | 250/367 |
| 4,090,081 A | * | 5/1978 | Takami et al. | 250/368 |
| 4,374,749 A | * | 2/1983 | Cusano et al. | 252/301.36 |
| 4,753,512 A | * | 6/1988 | Aurouet et al. | 359/108 |
| 4,933,562 A | * | 6/1990 | Roziere | 250/367 |
| 5,393,981 A | * | 2/1995 | Szabo et al. | 250/367 |
| 6,194,728 B1 | * | 2/2001 | Bosnjakovic | 250/370.11 |

FOREIGN PATENT DOCUMENTS

JP  5-341047  12/1993

* cited by examiner

Primary Examiner—David Porta
Assistant Examiner—Shun Lee
(74) Attorney, Agent, or Firm—Oblon, Spivak, McClelland, Maier & Neustadt, P.C.

(57) ABSTRACT

In a radiation detecting apparatus, an α ray and β ray are transmitted through a light shielding film but an incident light is shielded. A first light is emitted from a first scintillator by the α ray transmitted through the light shielding film. The first scintillator has an emission center wavelength based on the α ray. A second light is emitted in a second scintillator by the β ray transmitted through the light shielding film. The second scintillator has an emission center wavelength based on the β ray. The first and second lights are detected by two photo-detectors, respectively. The first emission center wavelength and the second emission center wavelength are different from each other.

4 Claims, 13 Drawing Sheets

RADIATION DETECTING APPARATUS

BACKGROUND OF THE INVENTION

1. Field of the Invention

The present invention relates to a radiation measurement technique used in a facility for handling radioactive material, such as a nuclear power plant or the like, and more particularly, to a radiation detecting apparatus which is capable of simultaneously and independently measuring radiations such as a and β rays at a same position, and is suitable to a practical use as a radiation monitor.

2. Description of the Prior Art

FIG. 20 shows a phoswich detecting apparatus (phosphor sandwich detecting apparatus) as a conventional example of a radiation detecting apparatus for simultaneously detecting an α ray and a β ray.

This radiation detecting apparatus is provided with a light shielding film 1 through which the α and β rays are transmitted and for shielding light from the outside of the apparatus. The radiation detecting apparatus is also provided with a first scintillator 2 and a second scintillator 3 which are piled up below the light shielding film 1 shown in FIG. 26.

There are many cases where ZnS (Ag) detecting an α ray is used as the first scintillator 2, and plastic detecting α and β rays is used as the second scintillator 3. The first and second scintillators 2 and 3 piled into two layers are directly mounted to a photo detector 5 so as to be received in a case 6. In general, a photo-multiplier tube having a high speed response and a high sensitivity is used as the photo-detector 5.

A decay time constant of emission of ZnS (Ag) constituting the first scintillator 2 is $\mu$ sec order, but that of emission of plastic constituting the second scintillator 3 is several tens of n sec order. Therefore, the decay time constant of emission of the plastic scintillator 3 is considerably shorter as compared with that emission of the ZnS (Ag) first scintillator 2. When an output current signal of the photo-detector 5 is converted into a voltage signal by means of an RC integrating circuit having a sufficiently long time constant as compared with each decay time constant of emission of the scintillators 2 and 3, a pulse rise time is substantially equal to a decay time of emission, and shows an index decay waveform of a time constant determined by a resistor R and a capacity C. This signal converting process can be carried out in a pre-amplifier unit connected to the photo-multiplier tube and included in the photo-detector 5.

The converted voltage signal is amplified up to a voltage level which is capable of being analyzed by means of a waveform discrimination processing unit 7, as the necessity arises. When the voltage signal is inputted in the waveform discrimination processing unit 7, an analog-digital converter of the processing unit 7, in order to output a pulse signal having a pulse height proportional to the rise time of the inputted signal, converts the pulse height of the inputted signal into a digital value so that a general analyzer of the processing unit 7 measures a pulse height distribution (a spectrum data) on the basis of the converted digital value.

It is possible to distinguish an emission of the first scintillator 2 and that of the second scintillator 3 on the basis of the spectrum data showing the rise time and obtained from the waveform discrimination processing unit 7.

FIG. 21 shows, as another conventional example, an α-β rays detecting apparatus using a sensor 8 for measuring energy spectrum.

For example, an Si semiconductor sensor is used as the sensor 8 for measuring energy spectrum of the above apparatus. However, the sensor 8 has a sensitivity to a room light and the like other than a radiation; for this reason, similarly to the above described radiation detecting apparatus, a light shielding film 1 is mounted on the sensor 8 so that the sensor 8 is housed in a case 6.

An output signal of the sensor 8 is analyzed by means of a pulse height analysis system 9, so as to be measured as an energy spectrum. In general, the analysis system 9 includes: a charge sensitive pre-amplifier for processing the sensor output signal; a linear amplifier, an analog-digital converter, a pulse height analyzer for analyzing multiple pulse heights and the like. In the energy spectrum data obtained by the analysis system 9, the α-ray data and the β-ray data show different distributions and peak shapes, respectively, and therefore, it is possible to distinguish the α ray and the β ray by processing these spectrum data corresponding to the a and β rays.

However, the pulse height discrimination processing unit 7 necessary for the conventional phoswich detecting apparatus shown in FIG. 20 is a processing unit for analyzing a pulse rise, and is very expensive. Therefore, this conventional detecting apparatus is useful to a study in an experimental level.

However, as a detecting apparatus which is mounted in a monitoring device used in an actual nuclear facility or the like, there is a problem relating to a cost. Moreover, the waveform discrimination processing unit analyzes a rise time itself, and is an over specification in the case of discriminating signals having different rise times, respectively.

Furthermore, in view of the principle, in order to obtain a rise time, for example, there is a need of carrying out a signal detection at a 10% level and a 90% level of an inputted pulse height value, so that there is a problem that it is impossible to analyze and measure a signal having a low pulse height value. This problem relates to a dynamic range of the pulse height value of the signal. For example, an emission of ZnS (Ag) scintillator generated by an α ray is considerably larger than that of the plastic scintillator generated by a β ray, and actually, the output signal of the photo-multiplier tube corresponding to the emission of ZnS (Ag) is larger 10 times or more as much as that of the photo-multiplier tube corresponding to the emission of β ray of the plastic scintillator at the point of time of being converted into the voltage signals.

Therefore, since the β ray signal has a low pulse height value and is continuously distributed on a low energy side, the measurement of the β ray is disadvantageous as compared with that of the α ray. In particular, a component of the β ray having a low pulse height value is not analyzed and measured so that there is a problem that an effective β-ray sensitivity gets to be low. Especially, in the case where a thickness of the plastic scintillator is made thin in order to suppress a γ-ray sensitivity, the emission of the plastic scintillator is further lowered so that the aforesaid phenomenon of lowering the effective β-ray sensitivity is further accelerated.

In addition, in the case of the radiation detecting apparatus using the energy spectrum measuring sensor 8 as shown in FIG. 21, the pulse height analyzer which is substantially equal to the above waveform discrimination processing unit must be required; as a result, there is a problem that the cost of the radiation detecting apparatus gets to be high. Furthermore, since an effective atomic weight of a base material of the energy spectrum measuring sensor 8 is larger than the plastic scintillator, a γ-ray sensitivity is high so that there is a problem that a γ-ray signal is mixed into a β-ray signal.

Still furthermore, in the case where measurement is not carried out in a vacuum state, or in the case of measuring an α ray from an α-ray emission nuclide absorbed to a filter paper, an energy loss of the α-ray is high and a fluctuation of range is large. For this reason, a Gaussian peak as obtained in vacuum is not obtained so that there is the case where the energy spectrum of the α-ray overlaps with that of the β-ray, whereby, in spite of measuring the energy spectrums of the α and β rays, it is hard to clearly distinguish the α ray and the β ray.

SUMMARY OF THE INVENTION

The present invention is directed to overcome the foregoing problems.

Accordingly, it is an object of the present invention to provide a radiation detecting apparatus which is capable of practically being used as a detector for radiation monitor, and being manufactured at a low cost, and further is able to independently and simultaneously detect an α ray and a β ray while maintaining sensitivities of these rays at the utmost limit and sufficiently preventing a γ ray sensitivity.

In addition, it is another object of the present invention to provide a radiation detecting apparatus having a rationally arrangement of first and second photo-detectors so as to make high an efficiency of detecting emissions of the first and second scintillators.

That is, in the radiation detecting apparatus, as described above, a light emitted in the first scintillator for α ray transmits through the second scintillator for β ray, and then, is guided to at least one photo-detector by means of condensing means. In this case, conventionally, the waveform discrimination processing unit for analyzing a rise of pulse has been applied in view of a pulse rise time of a signal converted by an RC integrating circuit, wherein the pulse rise time is substantially equal to a decay time of emission of each scintillator.

In view of this point of using the waveform discrimination processing unit, the inventors have a concept that it is possible to dispense with the waveform discrimination processing unit for analyzing a pulse rise, which is required for the conventional radiation detecting apparatus, by adjusting and optimizing the used scintillators, emission wavelengths of the scintillators and quantities of emission thereof.

More specifically, it is preferable that a photo-multiplier tube is used as a photo-detector in view of a response speed and sensitivity.

In other words, since the emission wavelength of the first scintillator is set to be different from that of the second scintillator, it is possible to adjust and optimize the scintillators, emission wavelengths of these scintillators and quantities of emission thereof in accordance with those. Furthermore, a detecting apparatus is constituted by intentionally varying the emission decay times of these scintillators and emission wavelengths thereof, whereby it is possible to provide means for optically discriminating between the emission wavelengths of these scintillators.

Moreover, as means for independently and simultaneously detecting an α ray and a β ray while securing the maximum sensitivity of them, the inventors have a concept that a light is easy to be confined in the first and second scintillators so as to improve each condensing density of each of the first and second scintillators by an arrangement thereof. More specifically, the first scintillator emitting a light by an α ray is formed very thin so as to restrict β-ray and γ-ray sensitivities, and for example, there are many cases where the first scintillator is composed of a powder, a sintering body and other similar materials. Therefore, in the first scintillator, a diffuse reflection is made therein so that a light is emitted thereto. The emitted light transmits through the second scintillator for a β ray so as to be guided to the photo-detector by the condensing means.

In this structure, in the case where an air is interposed between the first and second scintillators, when the light emitted from the first scintillator is transmitted through the second scintillator, though a probability of an occurrence of Fresnel reflection increases, since the second scintillator is surrounded by the air having a refractive index value lower than that of the second scintillator, it is easy to confirm the light emitted in the second scintillator. For this reason, as the condensing means for the second scintillator, it is easy to employ a method of using the emitted light condensed on the edge side of the second scintillator with a high density.

In accordance with the above described conception, in order to achieve such objects, according to one aspect of the present invention, there is provided a radiation detecting apparatus comprising: a light shielding film for transmitting therethrough first and second radiations while shielding an incidence of light; a first scintillator for emitting a first light by the first radiation transmitted through the light shielding film, the first scintillator having an emission center wavelength based on the first radiation; a second scintillator for emitting a second light by the second radiation transmitted through the light shielding film, the second scintillator having an emission center wavelength based on the second radiation; and detection means having at least one photo-detector for detecting the first light emitted from the first scintillator and the second light emitted in the second scintillator, the first emission center wavelength and the second emission center wavelength being different from each other.

In preferred embodiment of this one aspect, the first emission center wavelength is a wavelength of the first light emitted in the first scintillator and having a peak emission intensity in an emission wavelength band of the first scintillator, and the second emission center wavelength is a wavelength of the second light emitted in the second scintillator and having a peak emission intensity in an emission wavelength band of the second scintillator.

In preferred embodiment of this one aspect, the first scintillator and second scintillator are arranged in parallel to each other so that the second scintillator is located away from the first scintillator at a predetermined distance, further comprising means for condensing the first light emitted from the first scintillator and the second light emitted in the second scintillator on the detection means; and an air layer interposed between the first and second scintillators, the first emission center wavelength of the first scintillator being set shorter than the second emission center wavelength of the second scintillator.

According to the one aspect of the present invention described above, the air layer is interposed between the first and second scintillators, and thereby, the second scintillator is surrounded by the air layer having a refractive index value lower than itself, so that the second light is confined in the second scintillator. Therefore, it is easy to employ a method of using a light condensed on the edge side of the second scintillator with a high density. Furthermore, there is no need of providing an intermediate material required for bonding of these first and second scintillators and optically closely connecting them. In addition, the present invention is suitable for the case where there is an anxiety of alteration due to a chemical interaction of these intermediate materials and the first and second scintillators. Still furthermore, an independence of each scintillator is secured, making it possible to carry out maintenance, inspection and replacement with respect to only one of these scintillators.

Moreover, the emission center wavelength of the first scintillator is set shorter than the emission center wavelength of the second scintillator, making it possible to also use means for optically identifying wavelengths of the first and second lights so as to dispense a waveform discrimination processing unit for analyzing pulse rise times.

This one aspect of the present invention further has means for condensing the first light emitted from the first scintillator and the second light emitted in the second scintillator on the detection means, wherein the first scintillator and second scintillator are closely optically adhered with each other, the first emission center wavelength of the first scintillator being set shorter than the second emission center wavelength of the second scintillator.

According to the one aspect of the present invention, the first and second scintillators are arranged so as to optically closely be adhered with each other, making it possible to reduce an internal capture by a Fresnel reflection based on a difference in refractive indexes due to the air layer and by a total internal reflection in the second scintillator, and thus improving a transmission probability of the first light of the first scintillator through the second scintillator. Therefore, it is easy to employ of using the second light from the back surface of the second scintillator which is not adhered with the first scintillator.

This one aspect of the present invention further has means for condensing the first light emitted from the first scintillator and the second light emitted in the second scintillator on the detection means, wherein the first scintillator and second scintillator are closely optically adhered with each other, the first emission center wavelength of the first scintillator being set longer than the second emission center wavelength of the second scintillator.

According to the one aspect of the present invention, the first and second scintillators are arranged so as to optically and closely be adhered with each other, making it possible to improve a transmission probability of the first light of the first scintillator through the second scintillator. Therefore, it is easy to employ a method of condensing the first light of the first scintillator from the back surface of the second scintillator, as the condensing means.

One aspect of the present invention further has a condensing box for condensing the first and second lights on the detection means, the condensing box having an inner surface for diffusely reflecting the first and second lights and a side surface, the light shielding film being mounted on the side surface on which the first and second radiations incident, the first and second scintillators being arranged inside the light shielding film, and wherein the detection means comprises first and second photo-detectors each having a sensitive surface sensitive to each of the first and second lights; a first filter mounted on the sensitive surface of the first photo-detector; and a second filter mounted on the sensitive surface of the second photo-detector, the first filter being adapted to transmit therethrough only the first light emitted from the first scintillator, the second filter being adapted to transmit therethrough only the second light emitted in the second scintillator.

In the case of the one aspect of the present invention, the first and second lights having different emission wavelength bands are mixed to be filled in the condensing box while diffusely being reflected. The first filter is mounted on the sensitive surface of the first photo-detector, and the second filter is mounted on the sensitive surface of the second photo-detector. Because the first filter is adapted to transmit therethrough only the first light emitted from the first scintillator, and the second filter is adapted to transmit therethrough only the second light emitted in the second scintillator, it is possible to independently detect the first and second lights corresponding to the first and second radiations without using a specific electronic equipment for discrimination and identification. Furthermore, the condensing box is used so that it is easy to apply a large-area scintillator to the radiation detecting apparatus.

In preferred embodiment of this one aspect, the second scintillator has an incident surface on which the first and second radiations are incident and a back surface opposite to the incident surface, the detection means comprises first and second photo-detectors each having a sensitive surface sensitive to each of the first and second lights; a first filter mounted on the sensitive surface of the first photo-detector; and a second filter mounted on the sensitive surface of the second photo-detector, the first filter being adapted to transmit therethrough only the first light emitted from the first scintillator, the second filter being adapted to transmit therethrough only the second light emitted in the second scintillator, and wherein the first filter and the second filter are closely optically adhered on the back surface of the second scintillator.

In preferred embodiment of this one aspect, the second scintillator has a substantially rectangular shape, and wherein the first photo-detector and the second photo-detector are adjacently arranged so that a line is crossed to a longitudinal direction of the second scintillator, the line connecting a center point of the sensitive surface of the first photo-detector and that of the sensitive surface of the second photo-detector.

According to the one aspect of the present invention, it is possible to extremely decrease a probability that, when the second light emitted in the second scintillator away from the second filter is propagated therein, the second light passes on the first filter so as to be absorbed therein.

In preferred embodiment of this one aspect, the second scintillator has a substantially rectangular shape, and wherein the first photo-detector and the second photo-detector are arranged on both lateral sides of the second scintillator so that the first photo-detector is the most distant from the second photo-detector.

According to the one aspect of the present invention, it is possible to extremely decrease a probability that, when the second light emitted in the second scintillator away from the second filter is propagated therein, the second light passes on the first filter so as to be absorbed therein.

This one aspect of the present invention has an arrangement that the second scintillator has an incident surface on which the first and second radiations are incident and a back surface opposite to the incident surface, the detection means comprises first and second photo-detectors each having a sensitive surface sensitive to each of the first and second lights; a first filter mounted on the sensitive surface of the first photo-detector; and a second filter mounted on the sensitive surface of the second photo-detector, the first filter being adapted to transmit therethrough only the first light emitted from the first scintillator, the second filter being adapted to transmit therethrough only the second light emitted in the second scintillator, and wherein the first filter is arranged to be away from the back surface of the second scintillator at a predetermined interval so that an air layer is interposed between the back surface of the second scintillator and the first filter, and the second filter is closely optically adhered on the back surface of the second scintillator.

According to the one aspect of the present invention, it is possible to, when the second light emitted in the second scintillator away from the second filter is propagated therein, prevent the second light from passing on the first filter so as to get rid of the absorbing function of the second light by the first filter.

In preferred embodiment of this one aspect, the second scintillator has an incident surface on which the first and second radiations are incident and a back surface opposite to the incident surface, the detection means comprises first and second photo-detectors each having a sensitive surface sensitive to each of the first and second lights; a first filter mounted on the sensitive surface of the first photo-detector; and a second filter mounted on the sensitive surface of the second photo-detector, the first filter being adapted to transmit therethrough only the first light emitted from the first scintillator, the second filter being adapted to transmit therethrough only the second light emitted in the second scintillator, and wherein the first filter is arranged to be away from the back surface of the second scintillator at a predetermined interval, and the second filter is closely optically adhered on the back surface of the second scintillator, further comprising a surrounding box having an inner surface portion for surrounding a back surface side of the second scintillator so as to form a closed space therein, the back surface of the second scintillator and the first filter forming parts of the inner surface portion of the surrounding box, the inner surface portion of the surrounding box except for the back surface of the second scintillator and the first filter being processed to totally internally reflect diffusely the first light emitted from the first scintillator.

According to the one aspect of the present invention, it is possible to get rid of a bad influence of the first filter with respect to the second light incident through the second filter into the second photo-detector and to increase a probability that the first light emitted from the first scintillator and transmitted through the second scintillator is diffusely reflected to be detected through the first filter by the first photo-detector.

In preferred embodiment of this one aspect, the inner surface portion comprises a plurality of inner surfaces, each of the inner surfaces is inclined so that the diffusely reflecting directions on average of the first light on the inner surfaces of the surrounding box are substantially directed to a position of the second scintillator at which a center axis of the sensitive surface of the first photo-detector is crossed.

According to the one aspect of the present invention, it is possible to get rid of a bad influence of the first filter with respect to the second light incident through the second filter into the second photo-detector, and to reflect on average the first light emitted from the first scintillator and transmitted through the second scintillator toward a position of the second scintillator at which a center axis of the sensitive surface (first filter) of the first photo-detector is crossed, thereby increasing the probability that the first light is detected by the first photo-detector as compared with the first light which is uniformly distributed in the closed space.

This one aspect of the present invention further has a light guide in which the first light emitted from the first scintillator and the second light emitted in the second scintillator are incident, the light guide being adapted to condense the first and second lights on the detection means, and wherein the detection means comprises first and second photo-detectors each having a sensitive surface sensitive to each of the first and second lights; a first filter mounted on the sensitive surface of the first photo-detector; and a second filter mounted on the sensitive surface of the second photo-detector, the first filter being adapted to transmit therethrough only the first light emitted from the first scintillator, the second filter being adapted to transmit therethrough only the second light emitted in the second scintillator.

According to the one aspect of the present invention, the first and second lights having different wavelength bands are filled to be diffused in the light guide in a state of being mixed, and then, is propagated to the first and second photo-detectors. The first filter is mounted on the sensitive surface of the first photo-detector and the second filter is mounted on the sensitive surface of the second photo-detector. Because the first filter is adapted to transmit therethrough only the first light emitted from the first scintillator and the second filter is adapted to transmit therethrough only the second light emitted in the second scintillator, it is possible to independently detect the first and second lights corresponding to the first and second radiations without using a specific electronic equipment for discrimination and identification.

In preferred embodiment of this one aspect, the first filter is arranged to be away from the back surface of the second scintillator at a predetermined interval, and the second filter is closely optically adhered on the back surface of the second scintillator, and wherein the light guide has an opening surface opposite to the back surface of the second scintillator, the light guide being arranged so that the opening surface thereof being away from the back surface of the second scintillator at a predetermined interval so as to interpose an air layer between the opening surface of the light guide and the back surface of the second scintillator, the opening surface thereof having an area which is larger than that of the first filter.

According to the one aspect of the present invention, it is possible to get rid of a bad influence of the first filter with respect to the second light incident through the second filter into the second photo-detector. Moreover, since the first light emitted from the first scintillator and transmitted through the second scintillator is incident in the light guide so as to be guided through the first filter into the first photo-detector, it is possible to increase a probability that the first light is detected by the first photo-detector.

This one aspect of the present invention further has a light guide connecting the at least one photo-detector to an edge portion of the second scintillator, the light guide being adapted to convert the second light to a fluorescent light.

In the case of the one aspect of the present invention, an air is interposed between the first and second scintillators. Since the first scintillator is composed of, for example, a powder and a sintering substance or the like, a diffuse reflection is made in the first scintillator so that the diffusely reflected first light is emitted outside, thereby being once transmitted through the second scintillator, and thereafter, is filled in the condensing box. The first light filled in the condensing box is detected by means of, for example, a first photo-detector arranged in the condensing box. A component of the second light from the second scintillator is incident upon the condensing box; however, the second light is eliminated by, a filter provided on the first photo-detector.

The second scintillator is surrounded by an air; for this reason, the second light is confined in the second scintillator by a total internal reflection effect. As a result, a scintillation light is condensed on the edge portion of the second scintillator with a high density. The second scintillator is provided at the edge portion side of the second scintillator with the light guide containing a fluorescent substance of absorbing a scintillation photon and emitting a fluorescent light having a longer wavelength as compared with the second light, and thereby, a re-emission light occurs by a fluorescence conversion in the second scintillator. Since the re-emitted light is propagated while being totally internally reflected in the light guide, it is possible to detect a fluorescence light induced by re-emitted scintillation light by means of the photo-detector arranged on the end side of the light guide. Incidentally, the light guide may includes an optical fiber having a clad (referred to a fluorescence fiber, a wavelength shift fiber or the like).

In the condensing system on the edge side of the second scintillator, it is possible to condense the second light without depending upon an area of the second scintillator; and therefore, it is easy to apply the invention to a large-area scintillator together with the condensing box.

In preferred embodiment of this one aspect, the second scintillator has an incident surface on which the first and second radiations are incident and a back surface opposite to the incident surface, further comprising a fluorescent screen arranged on a back surface side of the second scintillator and opposite through an air layer to the back surface thereof, the fluorescent screen being adapted to convert the first light emitted from the first scintillator to a fluorescent light; and a light guide adapted to condense the converted fluorescent light on the at least one photo-detector, the converted fluorescent light being emitted from a surface of the fluorescent screen, the at least one photo-detector detecting the condensed fluorescent light.

According to the one aspect of the present invention, the first light from the first scintillator is transmitted through the second scintillator so as to be absorbed in the fluorescent screen, so that a re-emission of the fluorescence having a longer wavelength as compared with the second light is generated in the fluorescent screen. The re-emitted light is guided to the photo-detector via the light guide. Whereby it is possible to detect the fluorescence light induced by the first light.

In preferred embodiment of this one aspect, the second scintillator has an incident surface on which the first and second radiations are incident and a back surface opposite to the incident surface, further comprising a fluorescent screen arranged on a back surface side of the second scintillator and opposite through an air layer to the back surface thereof, the fluorescent screen being adapted to convert the first light emitted from the first scintillator to a fluorescent light; and a second light guide having a fluorescent substance adapted to absorb the converted fluorescent light so as to emit a fluorescent light, the converted fluorescent light by the fluorescent screen being emitted from an edge portion of the fluorescent screen, the fluorescent light emitted from the light guide having a wavelength which is longer than that of the converted fluorescent light by the fluorescent screen, the at least one photo-detector detecting the fluorescent light emitted from the second light guide.

According to the one aspect of the present invention, the first light from the first scintillator is transmitted through the second scintillator so as to be absorbed in the fluorescent screen so that a re-emission of the fluorescence having a longer wavelength is generated in the fluorescent screen. In this case, since the fluorescent screen is surrounded by an air, the first light is captured by the total internal reflection similarly to the second scintillator, and then, a fluorescence light is collected on the edge portion side of the fluorescent screen with a high density. Furthermore, since the fluorescent screen is provided with the second light guide for absorbing the fluorescent light generated in the fluorescent screen so as to emit a fluorescence light having a longer wavelength as compared with the fluorescent light generated in the florescence screen, it is possible to condense the emitted fluorescent light by a fluorescence conversion from the edge portion side of the fluorescent screen similarly to the second scintillator. Since the second light guide is provided at the edge portion of the second light guide with the photo-detector, it is possible to detect the first light of the first scintillator as a light which is double converted into a fluorescent light.

The one aspect of the present invention further has means for capturing a signal outputted from the detection means so as to recognize a signal having a predetermined pulse height value and over as an optical signal thereby eliminating a signal less than the predetermined pulse height value as a noise, the optical signal corresponding to at least one of the first and second lights emitted from the first and second scintillators.

According to the one aspect of the present invention, a signal outputted from the detection means is captured so that a signal having a predetermined pulse height value and over is recognized as an optical signal. On the other hand, a signal less than the predetermined pulse height value is eliminated as a noise.

In preferred embodiment of this one aspect, the detection means comprises a plurality of photo-detectors, a first group of the photo-detectors being adapted to detect the first light emitted from the first scintillator, a second group thereof being adapted to detect the second light emitted from the second scintillators, further comprising means for capturing signals outputted each of the first and second groups of the photo-detectors and, in a case of detecting signals outputted from at least one of the first and second groups of the photo-detectors, for recognizing detected signals corresponding to at least one of the first and second lights emitted from the first and second scintillators and, in a case where only one signal is outputted from at least one of the first and second groups of the photo-detectors, for eliminating the only one signal as a noise.

According to the one aspect of the present invention, the first lights are detected by the first group of the photo-detectors and the second lights are detected by the second group thereof. Each signal of each of the first and second groups of the photo-detectors is captured by the capturing means so that, in the case where signals outputted from at least one of the first and second groups of the photo-detectors are detected, it is recognized that the detected signals correspond to the first and second lights emitted from the first and second scintillators and, in a case where only one signal is outputted from at least one of the first and second groups of the photo-detectors, the signal is eliminated as a noise.

This one aspect of the present invention further has an optical attenuation filter for transmitting therethrough the first and second radiations and attenuating an intensity of the first light emitted from the first scintillator, the optical attenuation filter being interposed between the first and second scintillators; a condensing box for condensing the first and second lights on the detection means, the condensing box having an inner surface for diffusely reflecting the first and second lights; and means for inputting signals detected by the detection means so as to discriminate, according to a difference of waveforms of the inputted signals, between an optical signal corresponding to the first light emitted from the first scintillator and an optical signal corresponding to the second light emitted from the second scintillator.

The one aspect of the present invention further has an optical attenuation filter for transmitting therethrough the first and second radiations and attenuating an intensity of the first light emitted from the first scintillator, the optical attenuation filter being interposed between the first and second scintillators; a light guide in which the first light emitted from the first scintillator and the second light emitted in the second scintillator are incident, the light guide being adapted to condense the first and second lights on the detection means; and means for inputting signals outputted from the detection means so as to discriminate, according to a difference of waveforms of the inputted signals, between an optical signal corresponding to the first light emitted from the first scintillator and an optical signal corresponding to the second light emitted from the second scintillator.

In accordance with the one aspect of the present invention, the first and second radiations are transmitted through the optical attenuation so that the intensity of the first light is attenuated. The signals detected by the detection means are inputted to the discriminating means so that the detected signals are discriminated, according to a difference of waveforms of the inputted signals, between the optical signal corresponding to the first light emitted from the first scintillator and the optical signal corresponding to the second light emitted from the second scintillator.

BRIEF DESCRIPTION OF THE DRAWINGS

Other objects and aspects of the present invention will become apparent from the following description of embodiments with reference to the accompanying drawings in which.

DETAILED DESCRIPTION OF THE PREFERRED EMBODIMENTS

Figure 1:
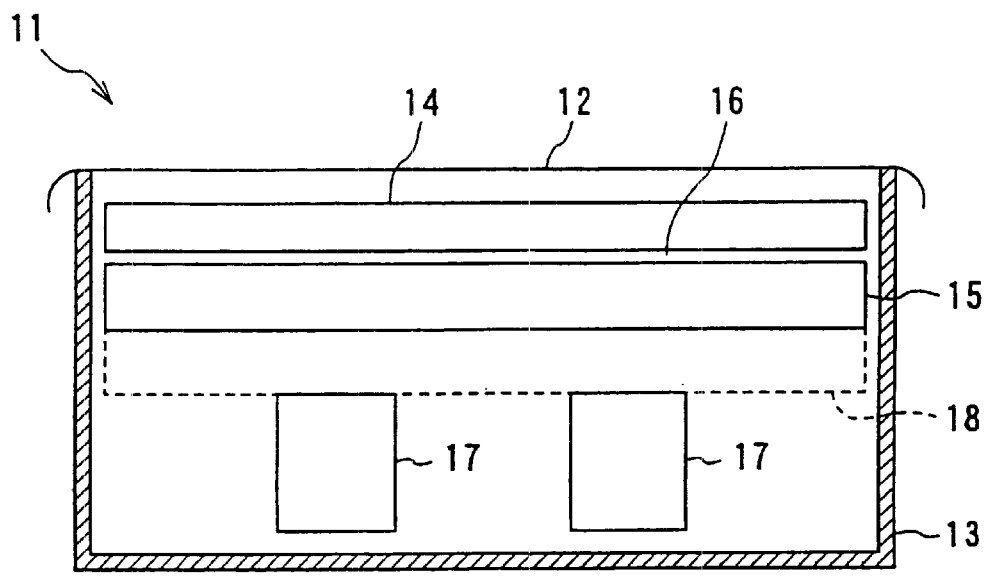
FIG. 1 is an elevational view partially in section showing a radiation detecting apparatus according to a first embodiment of the present invention.

Embodiments of the present invention will be described hereinafter according to FIGS. 1 to 19. It is noted that same or equivalent elements are denoted by the same or similar reference numerals throughout the drawings and that repetition descriptions of the elements are omitted or simplified.

First Embodiment (FIG. 1)

This first embodiment relates to a radiation detecting apparatus, and FIG. 1 is an elevational view partially in section showing a structure of the radiation detecting apparatus.

As shown in FIG. 1, a radiation detecting apparatus 11 according to this first embodiment comprises a case 13 having, for example, a substantially box-like shape. The case 13 is provided with an incident surface (upper surface in FIG. 1) on which radiations having different wavelengths, such as α and β rays are incident. The incident surface of the case 13 is formed with a light shielding film 12 capable of transmitting the a and β rays therethrough and shielding an incidence of light. The radiation detecting apparatus 11 also comprises a first scintillator 14 which is sensitive to an α ray and has, for example, a substantially plate-like and rectangular shape.

The first scintillator 14 has an incident surface on which the α ray and a β ray are incident (an upper surface in FIG. 1) and a back surface (lower surface in FIG. 1) opposite to the incident surface thereof. The first scintillator 14 is arranged on the inner side of the light shielding film 12 so that the incident surface of the first scintillator 14 is in parallel with a back surface (lower surface, inner surface in FIG. 1) of the light shielding film 12 opposite to the incident surface thereof. As described above, the first scintillator 14 and the second scintillator 15 are arranged in parallel with each other so that the first scintillator 14 and the second scintillator 15 have a two-layer structure.

Furthermore, the radiation detecting apparatus 11 comprises a second scintillator 15 which is sensitive to a β ray and has, for example, a substantially plate-like and rectangular shape.

The second scintillator 15 has an incident surface (an upper surface in FIG. 1) on which the β ray is incident and a back surface (lower surface in FIG. 1). The second scintillator 15 is arranged inwardly in the case 13 so that the incident surface of the second scintillator 15 is in parallel with the back surface of the first scintillator 14 whereby the second scintillator 15 is located away from the first scintillator 14 at a predetermined distance (interval).

The radiation detecting apparatus 11 also comprises an air which exists in the case 13 so that an air layer 16 is formed between the first and second scintillators 14 and 15.

In addition, the radiation detecting apparatus 11 comprises one or more photo-detector 17 arranged in the case 13 at a lower position opposite to the light shielding film 12 side (inner bottom surface side of the case 13 in FIG. 1). The radiation detecting apparatus 11 is also provided with a condensing unit 18 interposed between the second scintillator 15 and the photo-detector 17 so that lights emitted from the first and second scintillators 14 and 15 are condensed by means of the condensing unit 18 so as to be guided onto a sensitive surface of the photo-detector 17 which is sensitive to the lights.

As the first scintillator 14 for α ray, ZnS (Ag), ZnCdS (Ag) or $Gd_2O_2S$ and $Y_2O_2S$ powder to which Tb, Eu, Pr are added, are used. As the second scintillator 15 for β ray, a thin plastic scintillator or a thin scintillator made of other similar materials, which is capable of detecting the a and β rays while suppressing a γ-ray sensitivity and of transmitting therethrough the light emitted from the first scintillator 14 is permitted to be used. For example, the plastic scintillator has a thickness of approximately 1 mm. In this case, the thickness of the second scintillator is determined by taking account of a quantity of emission required for a photo-detector system including the photo-detector 17, a target β-ray energy, a γ-ray sensitivity or the like, so that the thickness of the second scintillator is differently set depending upon the usage.

In addition, all peripheral surfaces of the second scintillator 15 are optically polished.

This first embodiment includes the following two characteristic structures; more specifically, (1) an emission center wavelength (first emission center wavelength λ1) of the first scintillator 14 is set shorter than an emission center wavelength (second emission center wavelength λ2) of the second scintillator 15 (first characteristic structure); and (2) conversely, the first emission center wavelength λ1 of the first scintillator 14 is set longer than the second emission center wavelength λ2 of the second scintillator 15 (second characteristic structure).

Then, the expression "emission center wavelength of a scintillator" used herein is employed to mean "wavelength of the emission (light) which is emitted in the scintillator and has the peak emission intensity in the emission wavelength band of the scintillator".

That is, the first emission center wavelength λ1 of the first scintillator 14 means "wavelength of the emission (light) which is emitted in the first scintillator 14 and has the peak emission intensity in the emission wavelength band of the first scintillator 14", and the second emission center wavelength λ2 of the second scintillator means "wavelength of the emission (light) which is emitted in the second scintillator 15 and has the peak emission intensity in the emission wavelength band of the second scintillator 15". In these first and second characteristic structures, that is, in mutual relationships between the long and short wavelengths λ1 and λ2 of the first and second scintillators 14 and 15, there are individual features. Either of the first and second characteristics is able to be selectively used in relation to a balance of the accompanying condensing unit, a light transmission characteristic of each scintillator, the maximum sensitivity wavelength of the photo-detector, a quantum efficiency or the like.

According to the aforesaid structure, because the air (air layer 16) is interposed between the first and second scintillators 14 and 15, the surrounding of the second scintillator 15 is surrounded by the air having a refractive index lower than that of the second scintillator 15 itself so that it is easy to confine in the second scintillator 15 the light emitted therein. As a result, it is easy to employ, as the condensing unit with respect to the second scintillator 15, a method of using the light highly densely condensed on an edge side in the second scintillator 15. Incidentally, this method will be described in the later embodiment.

According to the above structure of this first embodiment, unlike the conventional structure, it is possible to dispense with an intermediate substance for bonding and optically closely coupling the first and second scintillators so that above structure is suitable for the case where there is a fear of a deterioration in quantity of the intermediate substance itself or another deterioration in quantity of a chemical interaction between the intermediate substance and the scintillators or the like. Furthermore, each independence of the scintillators 14 and 15 is secured, making it possible to carry out maintenance, inspection and replacement of only one of the scintillators.

In the aforesaid first characteristic structure, because the first emission center wavelength λ1 of the first scintillator 14 is set shorter than the second emission center wavelength λ2 of the second scintillator 15, the emission wavelength band of the first scintillator 14 and that of the second scintillator 15 are substantially separated so that it is possible to use together means for optically identifying the emission wavelengths of the lights emitted in the first and second scintillators 14 and 15, thereby dispensing the waveform discrimination processing unit for analyzing pulse rises.

Moreover, in the aforesaid second characteristic structure, the first emission center wavelength λ1 of the first scintillator 14 is set longer than the second emission center wavelength λ2 of the second scintillator 15, and thereby, in general, a light having a long wavelength and emitted from the first scintillator 14 having a high transmission efficiency in the scintillator is hard to be absorbed in the second scintillator 15. Therefore, it is possible to make small a probability of receiving absorption and emission by a fluorescent substance contained in the second scintillator 15, thus to prevent an influence of the light emitted from the first scintillator 14 with respect to the second scintillator 15.

As described above, according to the first embodiment, since the first and second scintillators having first and second different emission center wavelengths λ1 and λ2 are formed to have the two-layer structure, there is no need of measuring pulse height distributions based on the emissions from the first and second scintillators, making it possible to simultaneously and independently measure the α ray and the β ray with the use of the difference in their wavelengths.

Moreover, in this first embodiment, powder is used as the first scintillator 14, and for example, the powder may be applied to be fixed to the back surface of the light shielding film 12, that is, an inner surface of the light shielding film 12 facing the second scintillator 15 side. Whereby the α ray transmitted through the light shielding film 12 is incident upon the first scintillator 14 without being incident upon an extra air layer so as to be emitted in the first scintillator 14. In addition, because the first scintillator 14 is fixed on the back surface of the light shielding film 12, the air layer 16 is interposed between the first and second scintillators 14 and 15.

As a result, because there is a difference between the refractive index of the second scintillator 15 and that of air so that the difference causes a light capture effect by the total internal reflection of the emitted light in the second scintillator 15. Thus, the emitted light in the second scintillator 15 is confined in the second scintillator 15 itself so as to be propagated therein, making it possible to condense on the side of the second scintillator 15 the light propagated therein with a high density.

Figure 2:
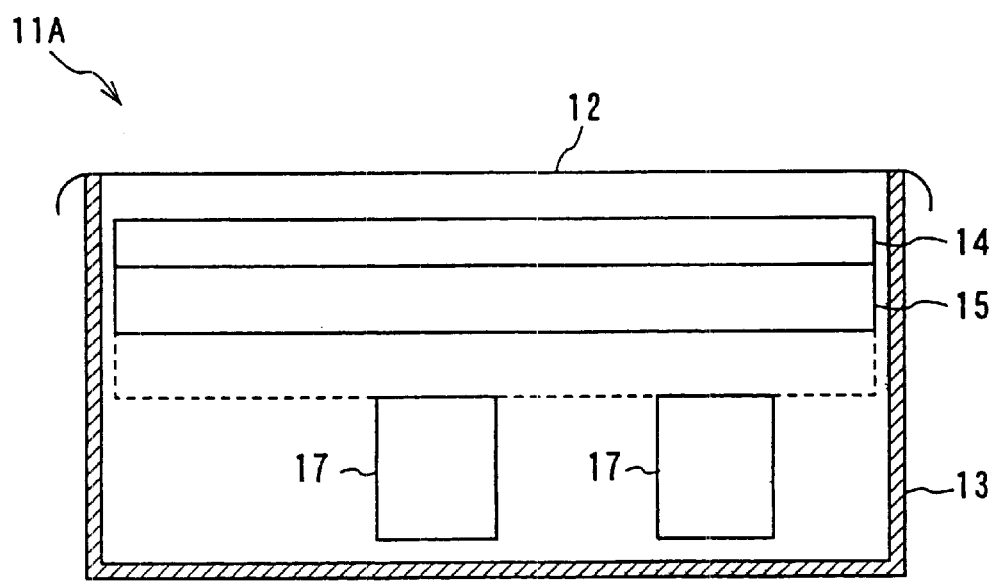
FIG. 2 is an elevational view partially in section showing a radiation detecting apparatus according to a second embodiment of the present invention.

Second Embodiment (FIG. 2)

FIG. 2 is an elevational view partially in section showing a radiation detecting apparatus according to a second embodiment of the present invention.

In this second embodiment, similar to the first embodiment, a radiation detecting apparatus 11A includes the case 13 whose one surface (incident surface) is covered with the light shielding film 12 capable of transmitting an α ray and β ray therethrough and shielding an incidence of light. In the case 13, the first scintillator 14 emitting a light by an α ray and the second scintillator 15 emitting a light by a β ray are arranged in a state of being closely optically coupled (adhered) without interposing an air layer between these scintillators 14 and 15.

That is, the back surface of the first scintillator 14 and the incident surface of the second scintillator 15 are closely and optically adhered with each other.

Furthermore, in the case 13, a condensing unit 18 is provided in combination with these first and second scintillator 14 and 15 so as to effectively condense the lights emitted from each of the first and second scintillators 14 and 15 to a photo-detector 17.

Similar to the first embodiment, this second embodiment includes the following two characteristic structures; more specifically, (1) the first emission center wavelength λ1 of the first scintillator 14 is set shorter than the second emission center wavelength λ2 of the second scintillator 15 (first characteristic structure); and (2) conversely, the first emission center wavelength λ1 of the first scintillator 14 is set longer than the second emission center wavelength λ2 of the second scintillator 15 (second characteristic structure).

In accordance with their individual features of mutual relationships between the long and short wavelengths λ1 and λ2 of the first and second scintillators 14 and 15, either of the first and second characteristics is able to be selectively employed in relation to a balance of the accompanying condensing unit, a light transmission characteristic of each scintillator, the maximum sensitivity wavelength of the photo-detector, a quantum efficiency or the like.

According to this second embodiment, the first and second scintillators 14 and 15 are optically closely adhered with each other, thereby making it possible to reduce an internal capture by a Fresnel reflection based on a difference in refractive indexes of the second scintillator 15 and an interposed air layer and by a total internal reflection in the second scintillator 15, so as to improve a transmission probability of the light emitted from the first scintillator 14 through the second scintillator 15. Therefore, it is easy to employ a condense unit having a condensing method of using a light from the back surface of the second scintillator 15 which is not adhered to the first scintillator 14.

As described above, since the first and second scintillators having first and second different emission center wavelengths λ1 and λ2 are formed to have a two-layer structure, there is no need of measuring pulse height distributions based on the emissions from the first and second scintillators, thereby making it possible to simultaneously and independently measure the α ray and the β ray with the use of the difference in their wavelengths.

Incidentally, this second embodiment is suitable for the case of applying the condensing unit based on a concept such that the emission lights from the respective first and second scintillators 14 and 15 are once mixed, and thereafter, optically or electrically separated. Conversely, the first embodiment is suitable for the case of applying the condensing unit based on a concept such that the emission lights from respective first and second scintillators 14 and 15 are not made into a state of being mixed as much as possible.

Figure 3:
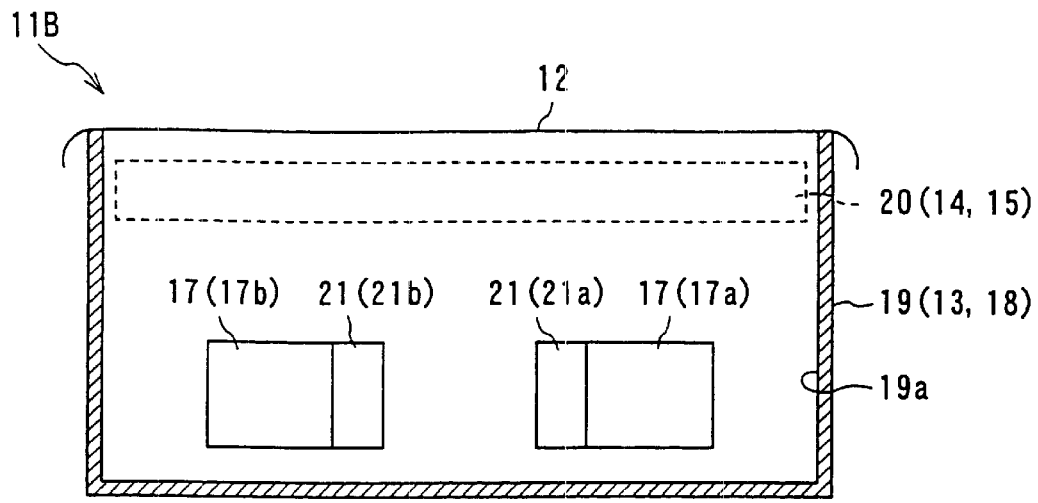
FIG. 3 is an elevational view partially in section showing a radiation detecting apparatus according to a third embodiment of the present invention.

Third Embodiment (FIG. 3)

FIG. 3 is an elevational view partially in section showing a radiation detecting apparatus according to a third embodiment of the present invention.

In the radiation detecting apparatus 11B of this third embodiment, a condensing unit 18 is formed as a condensing box 19 which is served as a case 13, and an inner surface 19a of the condensing box 19 is a diffuse reflection surface onto which a diffuse reflection material is applied. One surface of the condensing box 19 is opened so as to be used as an incident port. To the incident port, a light shielding film 12 is mounted for transmitting therethrough an α ray and β ray while shielding light from the outside.

The condensing box 19 is provided with a scintillator layer 20 which has a two-layer structure comprising the same first and second scintillators 14 and 15 as the aforesaid first or second embodiment, on the back side of the light shielding film 12. Lights emitted from the first and second scintillators 14 and 15 as the scintillator layer 20 are diffusely reflected by the inner surface 19a of the condensing box 19 so as to be mixed, thereby being filled therein.

Inside of the condensing box 19, two photo-detectors 17 (first and second photo-detectors 17a, 17b) are arranged in a line on the backside of the scintillator layer 20. A photo-multiplier tube is permitted to be used as each photo-detector 17. The first photo-detector 17a is provided with a sensitive surface to which a first filter 21a is mounted. The first filter 21a is adapted to transmit therethrough only light having the first emission wavelength band including the first emission center wavelength $\lambda 1$ of the first scintillator 14 from the mixed and filled light.

On the other hand, the second photo-detector 17b is provided with a sensitive surface to which a second filter 21b is mounted. The second filter 21b is adapted to transmit therethrough only light having a second emission wavelength band including the second emission center wavelength $\lambda 2$ of the second scintillator 15 from the mixed and filled light.

That is, because the light emitted from the first scintillator 14 is not transmitted through the second filter 21b of the photo-detector 17b, the light emitted from the first scintillator 14 and filled in the condensing box 19 is transmitted only through the first filter 21a of the photo-detector 17a so as to be detected thereby, so that a signal based on the emitted light from the first scintillator 14 is outputted only from the photo-detector 17a.

Similarly, because the light emitted from the second scintillator 15 is not transmitted through the first filter 21a of the first photo-detector 17a, the light emitted from the second scintillator 15 and filled in the condensing box 19 is transmitted only through the second filter 21b of the second photo-detector 17b so as to be detected thereby, so that a signal based on the emitted light from the second scintillator 15 is outputted only from the photo-detector 17b.

Namely, in this third embodiment, the optical wavelength discrimination is carried out so that independent signals are outputted from the individual photo-detectors 17a and 17b without using a special separating circuit.

According to the above structure, two lights having the first and second wavelength bands which are substantially separated from each other are diffusely reflected to the inner surface 19a of the condensing box 19 so as to be mixed and filled therein, differently from the aforesaid first and second embodiments in which each light emitted from each of the first and second scintillators 14 and 15 is transmitted on the back surface side of the second scintillator 15 which does not face to the first scintillator 14 side.

Therefore, since the first filter 21a for transmitting therethrough only light emitted from the first scintillator 14 is mounted to the first individual photo-detector 17a arranged in the condensing box 19 and the second filter 21b for transmitting therethrough only light emitted from the second scintillator 15 is mounted to the second individual photo-detector 17b arranged in the condensing box 19, it is possible to individually detect each of the emitted lights based on each of the $\alpha$ and $\beta$ rays without using a specific electronic device for discrimination and identification of the emitted lights. In addition, since the condensing box is used, it is easy to be applicable to scintillators each having a large area.

Thus, in this third embodiment, as described above, the first and second scintillators are made into a two-layer structure so that there is no need of measuring pulse height distributions and carrying out a waveform discrimination, making it possible to simultaneously and independently measure the a ray and the $\beta$ ray with the use of the difference in their wavelengths, and to provide a radiation detecting apparatus including scintillators each having large area.

Figure 4A:
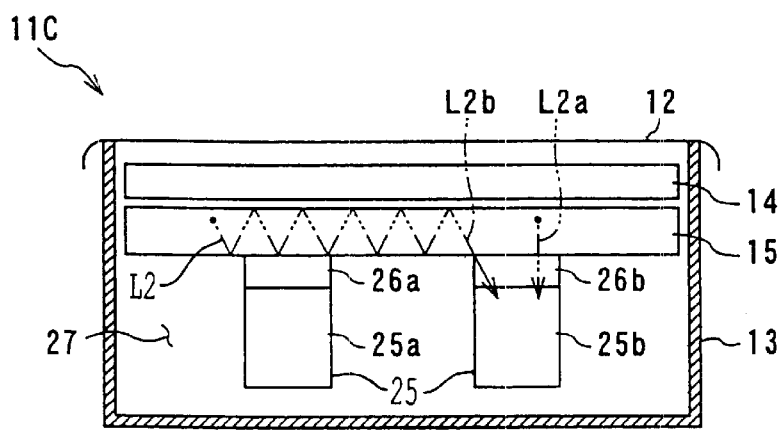
FIG. 4A is an elevational view partially in section showing a radiation detecting apparatus according to a fourth embodiment of the present invention.
Figure 4B:
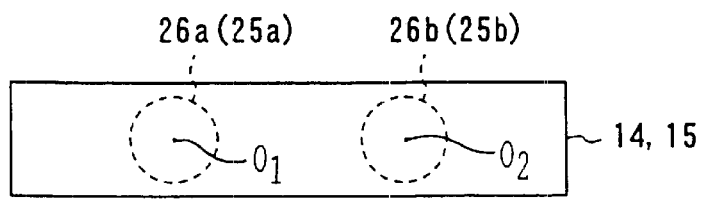
FIG. 4B is a plan view of the radiation detecting apparatus shown in FIG. 4A in the case of viewing the radiation detecting apparatus from an incident side of radiations.

Fourth Embodiment (FIGS. 4A, 4B)

FIG. 4A is an elevational view partially in section showing a radiation detecting apparatus according to a fourth embodiment of the present invention. FIG. 4B is a plan view of the radiation detecting apparatus shown in FIG. 4A in the case of viewing the radiation detecting apparatus from an incident side of radiations.

In the radiation detecting apparatus 11C of this fourth embodiment, since the structures of the case 13, the light shielding film 12, the first scintillator 14 and the second scintillator 15 are the same with those of the radiation detecting apparatus of the first embodiment, descriptions of the structures of the case 13, the light shielding film 12, the first scintillator 14 and the second scintillator 15 are omitted or simplified.

The radiation detecting apparatus 11C of the fourth embodiment comprises two photo-detectors 25 (first and second photo-detectors 25a, 25b) mounted in the case 13 on the backside of the second scintillator 15. A photo-multiplier tube is permitted to be used as each photo-detector 25.

The first and second photo-detectors 25a and 25b are arranged in parallel with a longitudinal direction of the second scintillator 15 and located away from each other at a predetermined interval.

The first photo-detector 25a of the photo-detectors 25 is provided with a sensitive surface to which a first filter 26a having a predetermined color (for example, red) is integrally mounted. The sensitive surface of the first photo-detector 25a and the first filter 26a have, for example, a substantially circular shape so that the first photo detector 25a and the first filter 26a are coaxially arranged.

The first filter 26a of the first photo-detector 25a is optically closely adhered to the back surface of the second scintillator 15.

The first filter 26a is adapted to transmit therethrough only light emitted from the first scintillator 14 and to absorb therein light emitted from the second scintillator 15.

Similarly, the second photo-detector 25b of the photo-detectors 25 is provided with a sensitive surface to which a second filter 26b having a predetermined color (for example, blue) is integrally mounted. The sensitive surface of the second photo-detector 25b and the second filter 26b have, for example, a substantially circular shape so that the second photo detector 25b and the second filter 26b are coaxially arranged.

The second filter 26b of the second photo-detector 25b is optically closely adhered to the back surface of the second scintillator 15.

The second filter 26b is adapted to transmit therethrough only light emitted in the second scintillator 15 and to absorb therein light emitted from the first scintillator 14.

The radiation detecting apparatus 11C also comprises an air which exists in the case 13 so that an air layer 27 is formed thereby surrounding the second filter 15.

According to the above structure, because the light emitted from the first scintillator 14 is not transmitted through the second filter 26b of the photo-detector 25b to be absorbed therein, the light emitted from the first scintillator 14 is transmitted only through the first filter 26a of the photo-detector 25a so as to be detected by the photo-detector 25a, so that a signal based on the emitted light from the first scintillator 14 is outputted only from the photo-detector 25a.

Similarly, because the light emitted from the second scintillator 15 is not transmitted through the first filter 25a of the photo-detector 26a to be absorbed therein, the light emitted from the second scintillator 15 is transmitted only through the second filter 26b of the photo-detector 25b so as to be detected by the photo-detector 25b, so that a signal based on the emitted light from the second scintillator 15 is outputted only from the photo-detector 25b.

Particularly, because the second scintillator 15 is surrounded by the air layer 27 having the refractive index which is lower than that of the second scintillator 15 itself, as shown in FIGS. 4A and 4B, the light L2 emitted in the second scintillator 15 is totally internally reflected on the surrounding air layer 27 so as to be diffused in the second scintillator 15 while being captured therein.

Because the light L2 emitted in the second scintillator 15 is diffused while being captured therein, the light L2a emitted at a portion in the second scintillator 15 close to the second filter 26b is directly incident into the second filter 26b and, in the case where the light L2b is emitted at a position in the second scintillator 15 away from the second filter 26b, the emitted light L2b is efficiently propagated to be incident into the second filter 26b.

Therefore, it is possible to efficiently detect the light L2 emitted in the second scintillator 15 by the second photo-detector 25b.

Figure 5A:
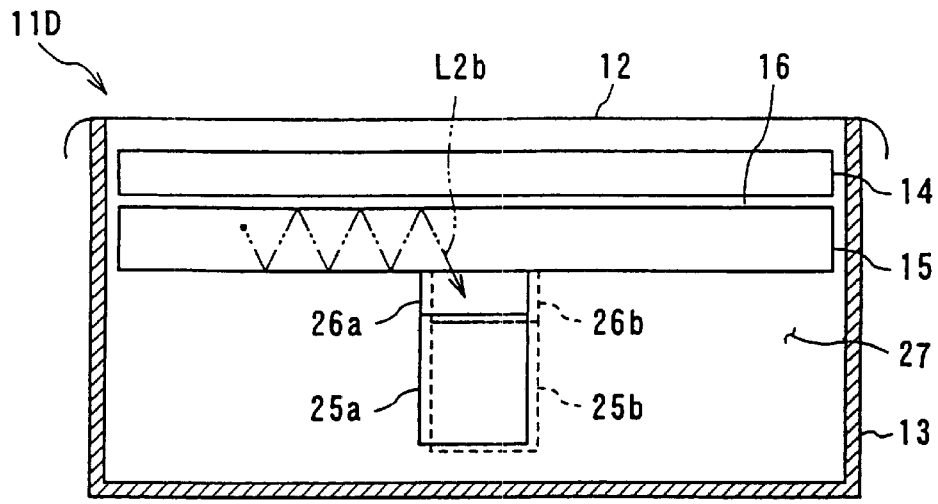
FIG. 5A is an elevational view partially in section showing a radiation detecting apparatus according to a fifth embodiment of the present invention.
Figure 5B:
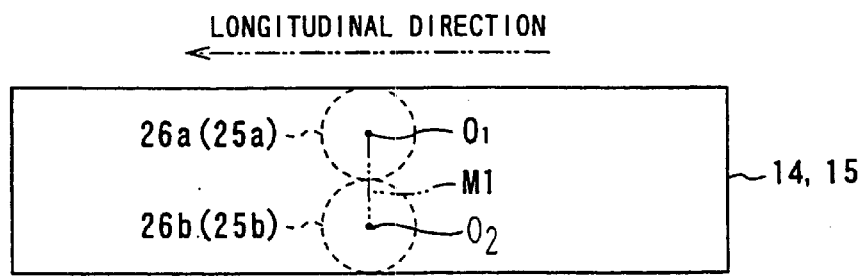
FIG. 5B is a plan view of the radiation detecting apparatus shown in FIG. 5A in the case of viewing the radiation detecting apparatus from an incident side of radiations.
Figure 5C:
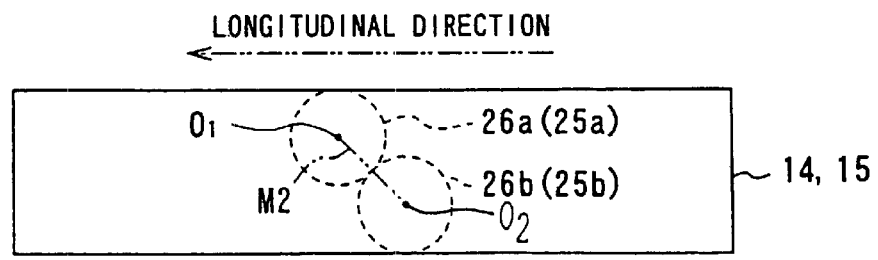
FIG. 5C is a plan view of a variation of the radiation detecting apparatus show in FIG. 5A.

Fifth Embodiment (FIGS. 5A to 5C)

FIG. 5A is an elevational view partially in section showing a radiation detecting apparatus according to a fifth embodiment of the present invention. FIG. 5B is a plan view of the radiation detecting apparatus shown in FIG. 5A in the case of viewing the radiation detecting apparatus from an incident side of radiations.

In the structure of the radiation detecting apparatus 11C according to the fourth embodiment, the first and second photo-detectors 25a and 25b are arranged in parallel with the longitudinal direction of the second scintillator 15 and located away from each other at a predetermined interval.

Therefore, there is the probability that, while the light L2 emitted at one side portion (a left side portion as one faces in FIG. 4A) in the second scintillator 15 away from the second filter 26b is propagated in the second scintillator 15 toward the second filter 26b, the light L2 passes through a portion of the second scintillator 15 on which the first filter 26a is contacted so as to be absorbed in the first filter 26a. Therefore, there is the possibility that the efficiency of detecting the light emitted at the one side portion in the second scintillator away from the second filter 26b is deteriorated whereby decreasing the uniformity of the sensitivity of the radiation detecting apparatus.

However, in this fifth embodiment, by devising the arrangement of the two photo-detectors including the filters it is possible to improve the efficiency of detecting the light emitted at the one side portion in the second scintillator away from the second filter and to improve the uniformity of the sensitivity of the radiation detecting apparatus.

In view of the aforesaid circumstances with respect to the structure of the radiation detecting apparatus according to the fourth embodiment, the radiation detecting apparatus 11D of this fifth embodiment has a characteristic structure in that, in the case where a first center point of the first filter 26a (the sensitive surface of the first photo-detector 25a) of the radiation detecting apparatus 11D is referred as O1 and a second center point of the second filter 26b (the sensitive surface of the second photo-detector 25b) thereof is referred as O2, the first photo-detector 25a integrally including the first filter 26a and the second photo-detector 25b integrally including the second filter 26b are adjacently arranged so that a line M1 connecting the first center point O1 and the second center point O2 is orthogonal to the longitudinal direction of the second scintillator 15.

Incidentally, other structures of the radiation detecting apparatus 11D of this fifth embodiment is substantially the same as the structures of the radiation detecting apparatus 11C of the fourth embodiment, and therefore, the descriptions about the other structures of the radiation detecting apparatus 11D are omitted.

In this fifth embodiment, the light L2b emitted at one side portion (a left side portion as one faces in FIGS. 5A and 5B) in the second scintillator 15 away from the second filter 26b is propagated in the second scintillator 15 toward the second filter 26b while being totally internally reflected on the air layer 27.

Then, because the first photo-detector 25a including the first filter 26a and the second photo-detector 25b including the second filter 26b are arranged so that the line M1 connecting the first center point O1 and the second center point O2 is orthogonal to the longitudinal direction of the second scintillator 15, the probability that the light L2b passes on the first filter 26a is decreased as compared with the fourth embodiment so that it is possible to improve the efficiency of detecting the light L2 emitted in the second scintillator 15.

Therefore, it is possible to efficiently detect the light L2 emitted in the second scintillator 15 by the second photo-detector 25b.

Incidentally, in this fifth embodiment, the first photo-detector 25a including the first filter 26a and the second photo-detector 25b including the second filter 26b are arranged so that the line M1 connecting the first center point O1 and the second center point O2 is orthogonal to the longitudinal direction of the second scintillator 15. However, the present invention is not limited to the structure. That is, as shown in FIG. 5C, the first photo-detector 25a including the first filter 26a and the second photo-detector 25b including the second filter 26b are arranged so that the line M2 connecting the first center point O1 and the second center point O2 may be crossed to the longitudinal direction of the second scintillator 15 at a given angle. It is preferable that the given angle is set close to a right angle.

Figure 6A:
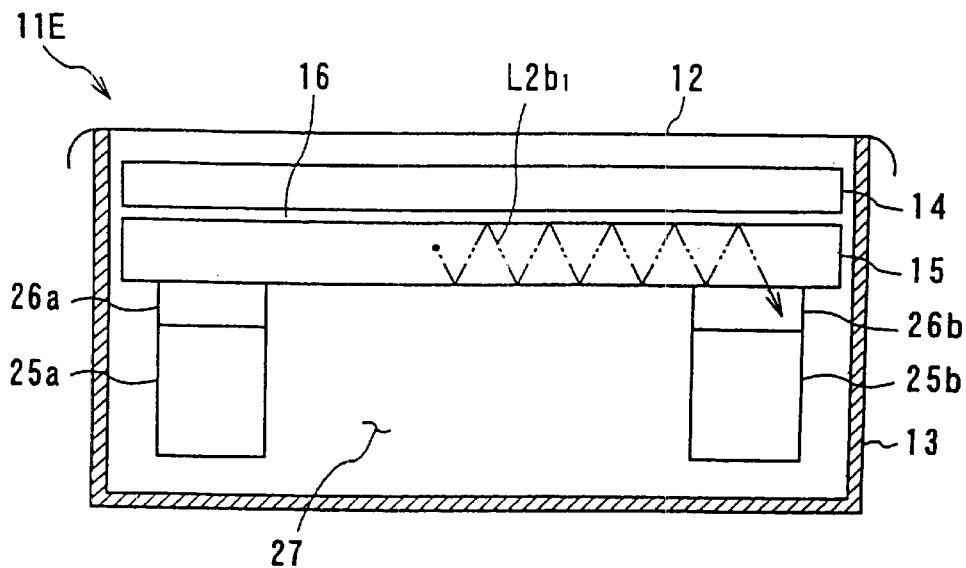
FIG. 6A is an elevational view partially in section showing a radiation detecting apparatus according to a sixth embodiment of the present invention.
Figure 6B:
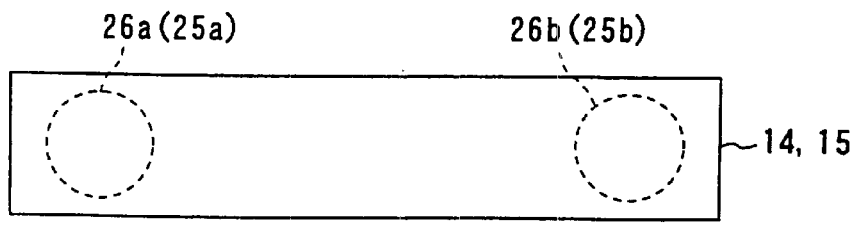
FIG. 6B is a plan view of the radiation detecting apparatus shown in FIG. 6A in the case of viewing the radiation detecting apparatus from an incident side of radiations.
Figure 6C:
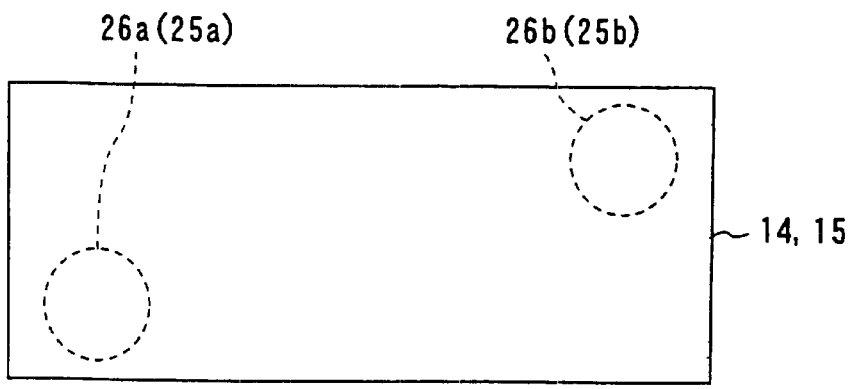
FIG. 6C is a plan view of the radiation detecting apparatus shown in FIG. 6A in the case of viewing the radiation detecting apparatus from an incident side of radiations according to a modification of the sixth embodiment.

Sixth Embodiment (FIGS. 6A to 6C)

FIG. 6A is an elevational view partially in section showing a radiation detecting apparatus according to a sixth embodiment of the present invention. FIG. 6B is a plan view of the radiation detecting apparatus shown in FIG. 6A in the case of viewing the radiation detecting apparatus from an incident side of radiations. Moreover, FIG. 6C is a plan view of the radiation detecting apparatus shown in FIG. 6A in the case of viewing the radiation detecting apparatus from an incident side of radiations according to a modification of the sixth embodiment.

In view of the aforesaid circumstances with respect to the structure of the radiation detecting apparatus according to the fourth embodiment, the radiation detecting apparatus 11E of this sixth embodiment has a characteristic structure in that the first photo-detector 25a integrally including the first filter 26a and the second photo-detector 25b integrally including the second filter 26b are arranged on both lateral end sides of the second scintillator 15 at a predetermined interval so that the first photo-detector 25a is the most distant from the second photo-detector 25b in the case 13.

That is, in the case where each lateral width of each of the first and second scintillators 14, 15 is saubstantially similar to each diameter of each filter 26a, 26b, as shown in FIG. 6B, the first filter 26a integrated with the first photo-detector 25a is optically closely adhered to one side edge portion (a left side portion as one faces in FIGS. 6A and 6B) of the second scintillator 15, and the second filter 26b integrated with the second photo-detector 25b is optically closely adhered to other side edge portion of the second scintillator 15.

In the case where each lateral width of each of the first and second scintillators 14, 15 is longer than each diameter of each filter 26a, 26b, as shown in FIG. 6C, the first filter 26a integrated with the first photo-detector 25a is optically closely adhered to one of corner portions of the second scintillator 15 and the second filter 26b integrated with the second photo-detector 25b is optically closely adhered to another one of the corner portions of the second scintillator 15, wherein another one of the corner portions of the second scintillator 15 is diagonally arranged to one of the corner portions thereof.

Incidentally, other structures of the radiation detecting apparatus 11E of this sixth embodiment is substantially the same as the structures of the radiation detecting apparatus 11C of the fourth embodiment, and therefore, the descriptions about the other structures of the radiation detecting apparatus 11E are omitted.

In this sixth embodiment, the light L2b1 emitted at a portion except for the one side portion to which the first filter 26a is adhered is propagated in the second scintillator 15 toward the second filter 26b while being totally internally reflected on the air layer 27.

Then, because the first photo-detector 25a integrally including the first filter 26a and the second photo-detector 25b integrally including the second filter 26b are arranged on both lateral sides of the second scintillator 15 at a predetermined interval so that the first photo-detector 25a is the most distant from the second photo-detector 25b in the case 13, the probability that the emitted light L2b1 passes on the first filter 26a is extremely decreased as compared with the fifth embodiment.

Furthermore, in this structure, when the emitted light L2b1 is propagated to a portion to which the second filter 26b is adhered, even if the emitted light L2b1 does not pass on the second filter 26b, it is possible to prevent the emitted light L2b1 from being propagated to the portion to which the first filter 26a is adhered. That is, by this arrangement of the first photo-detector 25a including the first filter 26a and the second photo-detector 25b including the second filter 26b, the propagating route of the light emitted from the first scintillator 14 and that of the light emitted in the second scintillator 15 are not interrupted with each other.

Figure 7:
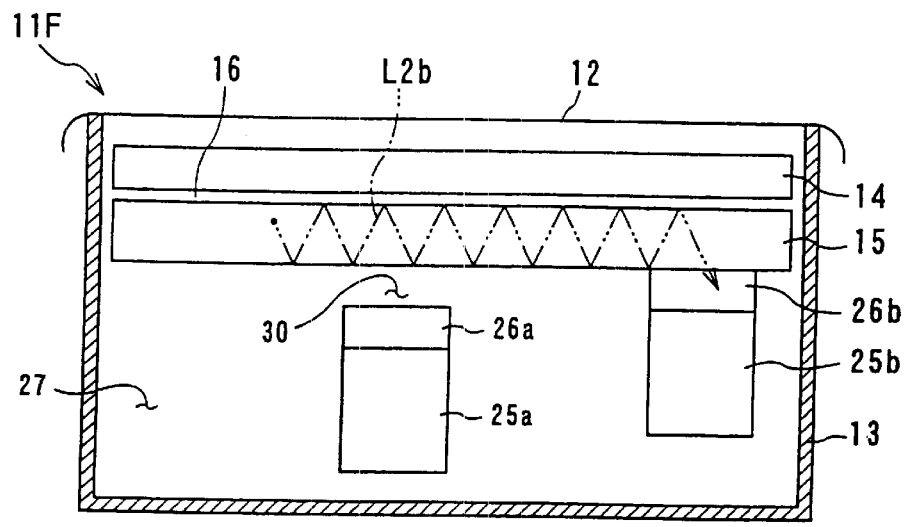
FIG. 7 is an elevational view partially in section showing a radiation detecting apparatus according to a seventh embodiment of the present invention.

Seventh Embodiment (FIG. 7)

FIG. 7 is an elevational view partially in section showing a radiation detecting apparatus according to a seventh embodiment of the present invention.

In view of the aforesaid circumstances with respect to the structure of the radiation detecting apparatus according to the fourth embodiment, the radiation detecting apparatus 11F of this seventh embodiment has a characteristic structure in that the first filter 26a of the first photo-detector 25a is not optically adhered to the back surface of the second scintillator 15. That is, the first filter 26a is arranged so as to be away from the back surface of the second scintillator 15 at a predetermined interval so that an air which exists in the case 13 whereby an air layer 30 is formed between the back surface of the second scintillator 15 and the first filter 26a of the first photo-detector 25a.

Incidentally, other structures of the radiation detecting apparatus 11F of this seventh embodiment is substantially the same as the structures of the radiation detecting apparatus 11C of the fourth embodiment, and therefore, the descriptions about the other structures of the radiation detecting apparatus 11F are omitted.

In this structure, because the second scintillator 15 is surrounded by the air layers 27 and 30 each having the refractive index which is lower than that of the second scintillator 15 itself, the light L2b emitted in the second scintillator 15 is totally internally reflected on the surrounding air layers 27 and 30 so as to be diffused in the second scintillator 15 while being captured therein.

Therefore, in the case where the light L2b is emitted at a position in the second scintillator 15 away from the second filter 26b, the emitted light L2b does not pass on the first filter 26a of the first photo-detector 25a so that the emitted light L2b is efficiently propagated to be ideally incident into the second filter 26b without any influence of the first filter 26a.

Therefore, it is possible to efficiently detect the light L2 emitted in the second scintillator 15 by the second photo-detector 25b.

Figure 8A:
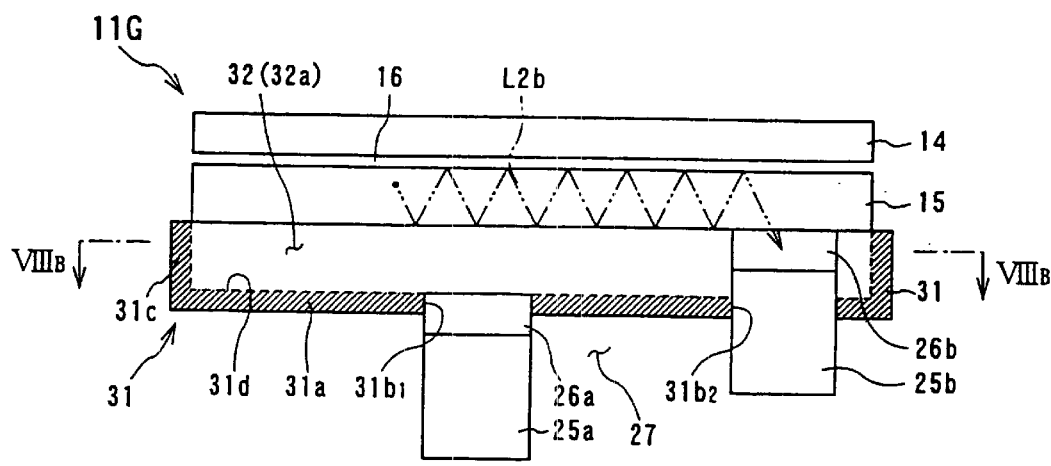
FIG. 8A is an elevational view partially in section showing a radiation detecting apparatus according to an eighth embodiment of the present invention.
Figure 8B:
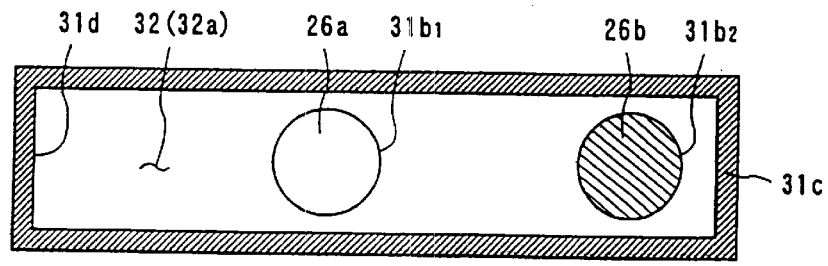
FIG. 8B is a cross sectional view taken on line VIIIB—VIIIB in FIG. 8A.

Eighth Embodiment (FIGS. 8A,8B)

FIG. 8A is an elevational view partially in section showing a radiation detecting apparatus according to an eighth embodiment of the present invention. FIG. 8B is a cross sectional view taken on line VIIIB—VIIIB in FIG. 8A.

In view of the aforesaid circumstances with respect to the structure of the radiation detecting apparatus according to the fourth embodiment, the radiation detecting apparatus 11G of this eighth embodiment further comprises a reflecting box 31 attached to the second scintillator 15 for totally internally reflecting diffusely the emitted light from the first scintillator 14.

Incidentally, in this embodiment, the light shielding file 12 and the case 13 are omitted in FIG. 7.

The reflecting box 31 is provided with an opening upper surface and a bottom wall 31a having a substantially rectangular shape which is substantially the same with the back surface of the second scintillator 15 and arranged in parallel with the back surface thereof. The bottom wall 31a is formed with two apertures 31b1, 31b2. The two apertures 31b1 and 31b2 are arranged in parallel with the longitudinal direction of the second scintillator 15 at a predetermined interval. One 31b1 of the apertures is formed on a center portion of the bottom wall 31a and the other 31b2 thereof is formed on one end portion thereof.

The first filter 26a of the first photo-detector 25a is buried in the aperture 31b1 so that the first filter 26a is arranged so as to be away from the back surface of the second scintillator 15 at the distance between the back surface thereof and the bottom wall 31a.

The second photo-detector 25b including the second filter 26b is penetrated through the aperture 31b2 so that the second filter 26b is optically closely adhered to the back surface of the second scintillator 15.

The reflecting box 31 is also provided with four side walls 31c attached to the bottom wall 31a so as to extend four side edge portions thereof to the back surface of the second scintillator 15 thereby being closely connected thereto, and therefore, a closed space 32 is formed among the back surface of the second scintillator 15, the side walls 31c of the reflecting box 31 and the bottom wall 31a thereof. That is, the closed space 32 is surrounded by the back surface of the second scintillator 15, the side walls 31c and the bottom wall 31a so that an air exists in the closed space 32 whereby an air layer 32a is formed therein.

In addition, inner surfaces (reflection surfaces) 31d of the bottom and side walls 31a and 31c are processed so as to totally internally reflect diffusely the light emitted from the first scintillator 14. For example, a material capable of effectively diffusely reflecting the light than a material of which the reflecting box 31 is made, such as a titanium oxide or other similar materials is applied on the inner surfaces 31d of the bottom and side walls 31a and 31c.

Incidentally, other structures of the radiation detecting apparatus 11G of this eighth embodiment is substantially the same as the structures of the radiation detecting apparatus 11C of the fourth embodiment, and therefore, the descriptions about the other structures of the radiation detecting apparatus 11G are omitted.

In this structure, because the second scintillator 15 is surrounded by the air layer 32a existing in the closed space 32 having the refractive index which is lower than that of the second scintillator 15 itself, the light L2b emitted in the second scintillator 15 is totally internally reflected on the air layer 32a so as to be diffused in the second scintillator 15 while being captured therein.

Therefore, in the case where the light L2b is emitted at a position in the second scintillator 15 away from the second filter 26b, the emitted light L2b does not pass on the first filter 26a of the first photo-detector 25a so that the emitted light L2b is efficiently propagated to be ideally incident into the second filter 26b without any influence of the first filter 26a.

Therefore, it is possible to efficiently detect the light L2 emitted in the second scintillator 15 by the second photo-detector 25b.

In addition, the emitted light from the first scintillator 14 is transmitted through the second scintillator 15 to be filled in the closed space 32 while being totally internally reflected diffusely on the reflection surfaces 31d. Therefore, it is possible to improve the probability that the emitted light from the first scintillator 14 is reached to the first filter 26a to be incident thereinto.

In general, assuming that photons are uniformly distributed by the diffused reflection, the longer is the percentage of the sensitive area of the first filter 26a sensitive to the emitted light in all inner surface areas of the reflection surfaces 31d, the more it is possible to improve the probability that the emitted light from the first scintillator 14 is condensed on the first filter 26a.

Figure 9A:
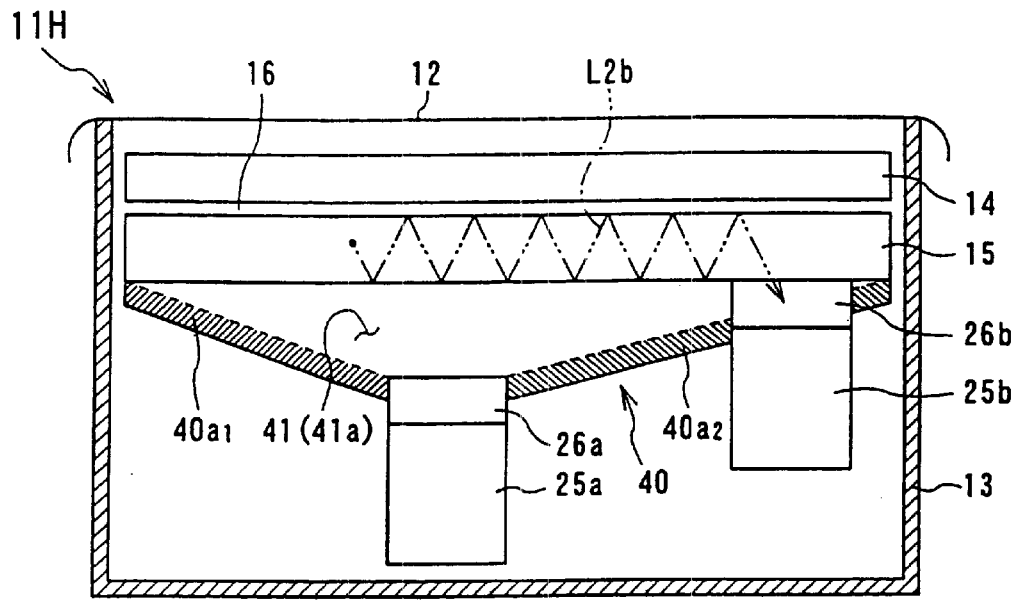
FIG. 9A is an elevational view partially in section showing a radiation detecting apparatus in the case of viewing the radiation detecting apparatus from a lateral side of first and second scintillators thereof according to a ninth embodiment of the present invention.
Figure 9B:
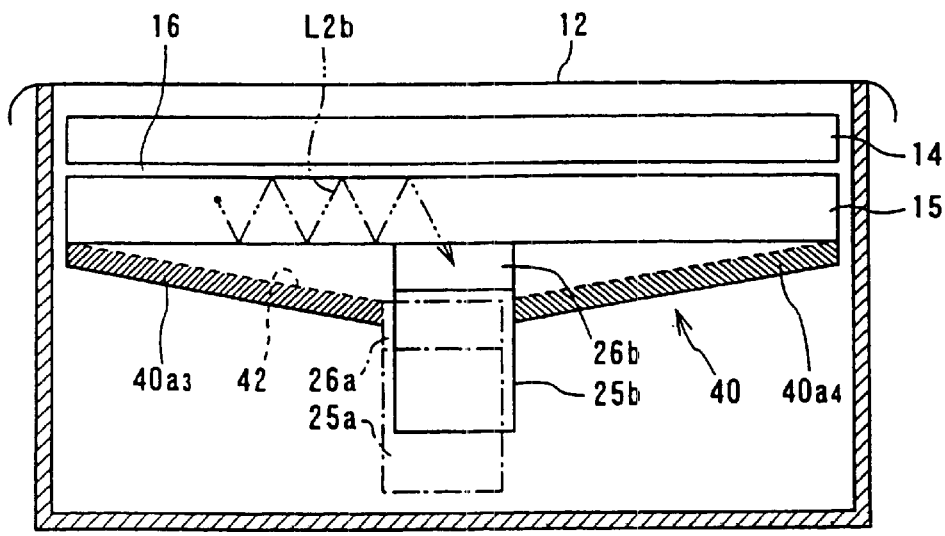
FIG. 9B is an elevational view partially in section showing a radiation detecting apparatus in the case of viewing the radiation detecting apparatus from a longitudinal side of the first and second scintillators thereof according to the ninth embodiment.

Ninth Embodiment (FIGS. 9A,9B)

FIG. 9A is an elevational view partially in section showing a radiation detecting apparatus in the case of viewing the radiation detecting apparatus from a lateral side of first and second scintillators thereof according to a ninth embodiment of the present invention. FIG. 9B is an elevational view partially in section showing a radiation detecting apparatus in the case of viewing the radiation detecting apparatus from a longitudinal side of the first and second scintillators thereof according to the ninth embodiment.

In view of the aforesaid circumstances with respect to the structure of the radiation detecting apparatus according to the fourth embodiment, the radiation detecting apparatus 11H of this ninth embodiment further comprises, in order to improve an incident probability of the light emitted from the first scintillator 14 into the first filter 26a, a reflecting plate (reflecting box) 40 having four reflecting walls 40a1 to 40a4 for diffusely and totally internally reflecting on the four inclined reflecting walls 40a1 to 40a4 the emitted light from the first scintillator 14 so that reflecting directions on average of the diffusely reflected lights on the four reflecting walls 40a1 to 40a4 are directed to a first scintillator side of the first filter 26a.

The four reflecting walls 40a to 40a4 of the reflecting plate 40 are attached to four edge portions of the back surface of the second scintillator 15 and to the first filter 26a of the first photo-detector 25a which is arranged so as to be away from the back surface of the second scintillator 15 at a predetermined interval.

On back side of the second scintillator 15, a closed space 41 is formed among the back surface of the second scintillator 15 and the four reflecting walls 40a1 to 40a4. That is, the closed space 41 is surrounded by the back surface of the second scintillator 15 and the four reflecting walls 40a1 to 40a4 so that an air exists in the closed space 41 whereby an air layer 41a is formed therein.

In addition, inner surfaces (reflection surfaces) 42 of the reflecting walls 40a1 to 40a4 are processed so as to totally internally reflect diffusely the light emitted from the first scintillator 14, similar to the fourth embodiment.

In this embodiment, each of the reflecting walls 40a1 to 40a4 is inclined at a predetermined angle with respect to a direction of a center axis (a line vertically extending from a center of the first filter 26a) of the first filter 26a so that the reflecting directions on average of the diffusely reflected lights on the four reflecting walls 40a1 to 40a4 are directed to a position of the second scintillator 15 at which the center axis of the first filter 26a is crossed.

Actually, it is possible to easily realize the structure of the radiation detecting apparatus 11H according to the ninth embodiment by providing the reflecting walls 40a1 to 40a4 of the reflecting plate 40 in the case 13 with the angles of the reflecting walls 40a1 to 40a4 with respect to the center axial direction of the first scintillator 26a being adjusted, respectively.

Incidentally, other structures of the radiation detecting apparatus 11H of this ninth embodiment is substantially the same as the structures of the radiation detecting apparatus 11C of the fourth embodiment, and therefore, the descriptions about the other structures of the radiation detecting apparatus 11H are omitted.

In this structure, similar to the eighth embodiment, in the case where the light L2b is emitted at a position in the second scintillator 15 away from the second filter 26b, the emitted light L2b does not pass on the first filter 26a of the first photo-detector 25a so that the emitted light L2b is efficiently propagated to be ideally incident into the second filter 26b without any influence of the first filter 26a.

Therefore, it is possible to efficiently detect the light L2 emitted in the second scintillator 15 by the second photo-detector 25b.

In addition, it is noted that a reflection angle on the diffusion reflection surfaces is distributed like a cosine distribution by the Lambert's law.

For this reason, because each of the reflecting walls 40a1 to 40a4 is inclined so that the reflecting directions on average of the diffusely reflected lights on the four reflecting walls 40a1 to 40a4 are directed toward the second scintillator 14 side, the emitted light from the first scintillator 14 transmitted through the second scintillator 15 and filled in the closed space 41 is diffusely reflected to each reflection surface 42 of each of the reflecting walls 40a1 to 40a4 so as to be transmitted toward the second scintillator 15 and the first scintillator 14.

Then, the transmitted light emitted from the first scintillator 14 is diffusely reflected on the second scintillator or the first scintillator 14 so as to be directed to the first filter 26a.

Therefore, it is possible to increase a quantity of the emitted light from the first scintillator 14 which is condensed on the first filter 26a.

Incidentally, in this structure, the reflecting plate has four reflecting walls, but the present invention is not limited to the structure. That is, the reflecting plate may have a peripheral wall whose normal lines are directed to the position of the second scintillator at which the center axis of the first filter is crossed.

Figure 10A:
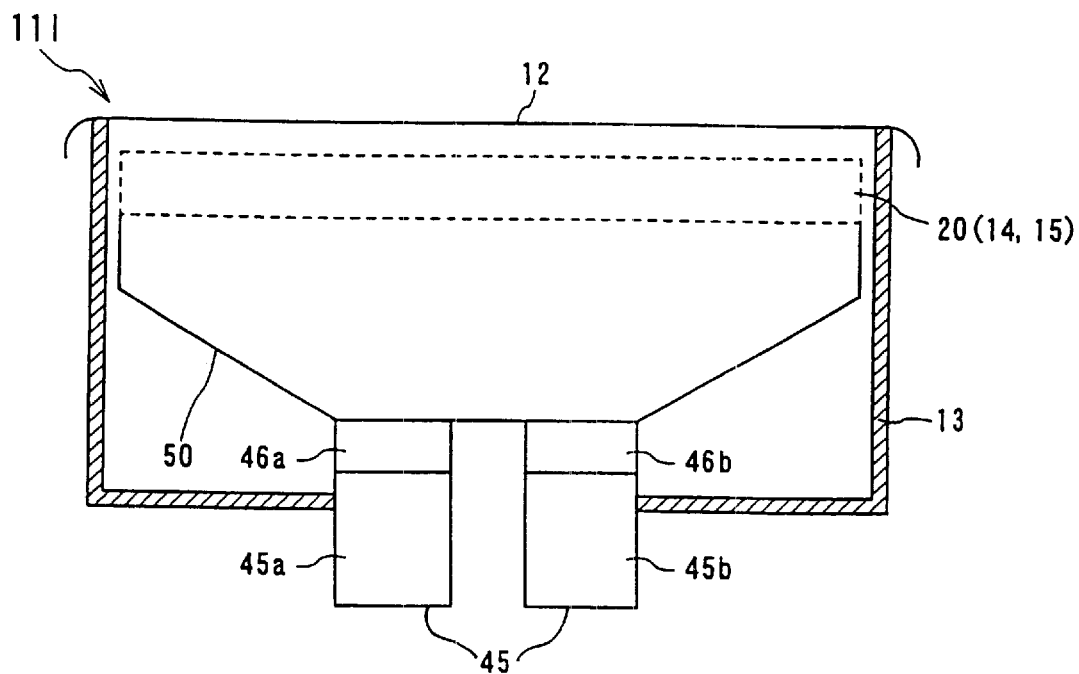
FIG. 10A is an elevational view partially in section showing a radiation detecting apparatus according to a tenth embodiment of the present invention.
Figure 10B:
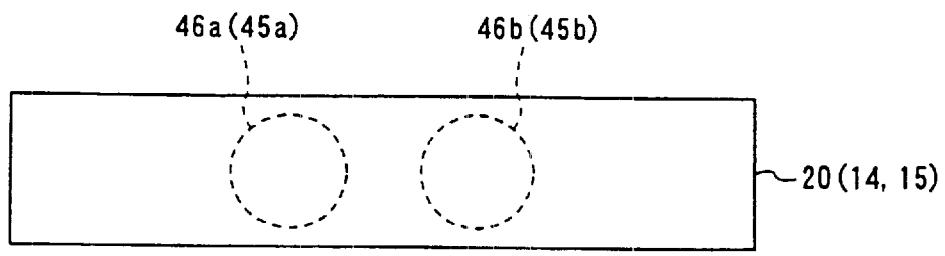
FIG. 10B is a plan view of the radiation detecting apparatus shown in FIG. 10A in the case of viewing the radiation detecting apparatus from an incident side of radiations.

Tenth Embodiment (FIGS. 10A,10B)

FIG. 10A is an elevational view partially in section showing a radiation detecting apparatus according to a tenth embodiment of the present invention. FIG. 10B is a plan view of the radiation detecting apparatus shown in FIG. 10A in the case of viewing the radiation detecting apparatus from an incident side of radiations.

In this tenth embodiment, since the structures of the case 13, the light shielding film 12 and the scintillator layer 20 (the first scintillator 14 and the second scintillator 15) are the same with those of the radiation detecting apparatus of the third embodiment, descriptions of the structures of the case 13, the light shielding film 12 and the scintillator layer 20 (the first scintillator 14 and the second scintillator 15) are omitted or simplified.

The radiation detecting apparatus 11I of the tenth embodiment comprises two photo-detectors 45 (first and second photo-detectors 45a, 45b) mounted on the inner bottom surface of the case 13 so that the first photo-detector 45a and the second photo-detector 45b are distant from the second scintillator 15.

Similar to some of the above embodiments, as shown in FIG. 10B, the first and second photo-detectors 45a and 45b are arranged in parallel with a longitudinal direction of the second scintillator 15 and located adjacent to each other.

The first photo-detector 45a is provided with a sensitive surface to which a first filter 46a is integrally mounted.

The first filter 46a is adapted to transmit therethrough only light emitted from the first scintillator 14 and to absorb therein light emitted from the second scintillator 15.

Similarly, the second photo-detector 45b is provided with a sensitive surface to which a second filter 46b is integrally mounted. The second filter 46b is adapted to transmit therethrough only light emitted in the second scintillator 15 and to absorb therein light emitted from the first scintillator 14.

In addition, the radiation detecting apparatus 11I further comprises a light guide 50 interposed between the second scintillator 15, and the first and second filters 46a and 46b for guiding the light emitted from the first scintillator 14 and the light emitted from the second scintillator onto the first and second filters 46a and 46b.

The light guide 50 is made of a material which is transparent to each of the emission wavelength bands of each of the first and second scintillators 14 and 15.

The light guide 50 has a substantially a truncated cone shape having an opening top surface, a bottom surface forming therewith two apertures and a side peripheral wall.

The opening top surface of the light guide 50 has a substantially rectangular shape which is substantially the same with the back surface of the second scintillator 15 so that the light guide 50 is closely adhered at its opening top surface to the back surface of the second scintillator 15.

The peripheral surface of the light guide 50 is tapered toward the bottom inner surface of the case 13 so that an area of each of the apertures is sufficiently small corresponding to an area of each of the first and second filters 46a, 46b.

That is, the apertures are arranged in parallel with the longitudinal direction of the second scintillator 15 at a predetermined interval corresponding to the arrangement of the first and second photo-detectors 45a and 45b so that the first and second photo-detectors 45a and 45b are inserted in the apertures, respectively.

In the third embodiment, the lights emitted from the first and second scintillators 14 and 15 are filled in the condensing box 19 having the diffusion reflection surface as the inner surface 19a.

On the contrary, in this tenth embodiment, the lights emitted from the first and second scintillators 14 and 15 are filled in the light guide 50 so that the light emitted from the first scintillator 14 and filled in the light guide 50 is guided so as to be transmitted only through the first filter 46a of the photo-detector 45a thereby being detected by the photo-detector 45a.

Similarly, the light emitted from the second scintillator 15 and filled in the condensing box 19 is guided so as to be transmitted only through the second filter 46b of the photo-detector 45b thereby being detected by the photo-detector 45b.

Therefore, it is possible to obtain the above effect according to the third embodiment.

In addition, in the structure of this tenth embodiment, because the lights emitted from the first and second scintillators 14 and 15 are filled in the light guide 50, it is possible to arbitrarily set a shape and size of the light guide 50, thereby applying a photo-detector having a small size as each of the photo-detectors 45a and 45b.

Moreover, similar to the above embodiments, it may be effective to process an outer surface of the side peripheral wall of the light guide 50 so that the outer surface is polished so as to totally internally reflect the light emitted from the first scintillator 14. Furthermore, it may be also effective to process the outer surface of the side peripheral wall of the light guide 50 so as to mirror or diffusely reflect the light emitted from the first scintillator 14.

Incidentally, in this structure, the photo-detectors 45a, 45b are arranged so as to closely be coupled with the outer side of the light guide 50. However, the present invention is not limited to the above structure. That is, similar to the above embodiments, the side peripheral wall of the light guide 50 may be formed with two concave portions in which the photo-detectors 45a, 45b are closely embed, as the case may be.

According to this tenth embodiment, as described above, the first and second scintillators are made into a two-layer structure so that there is no need of measuring pulse height distributions and carrying out a waveform discrimination, making it possible to simultaneously and independently measure the α ray and the β ray with the use of the difference in their wavelengths, and to apply a photo-detector having a small size as each of the photo-detectors, thereby making the radiation detecting apparatus compact.

Figure 11:
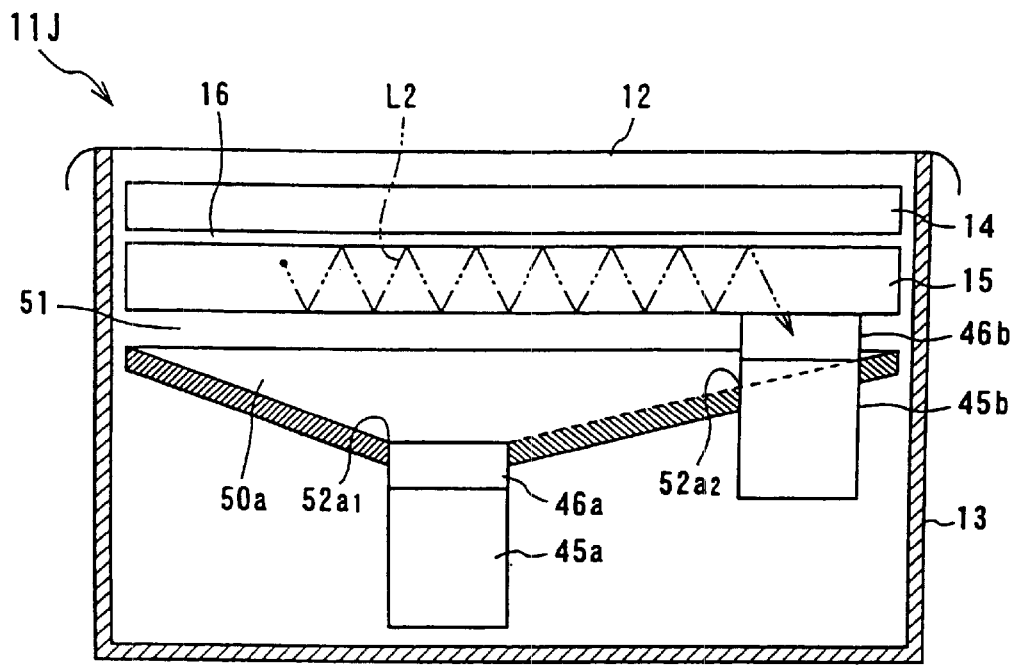
FIG. 11 is an elevational view partially in section showing a radiation detecting apparatus according to an eleventh embodiment of the present invention.

Eleventh Embodiment (FIG. 11)

FIG. 11 is an elevational view partially in section showing a radiation detecting apparatus according to an eleventh embodiment of the present invention.

In view of the aforesaid circumstances with respect to the structure of the radiation detecting apparatus according to the fourth embodiment, in the radiation detecting apparatus 11J of this embodiment, the arrangement of the first and second photo-detectors including the first and second filters, the shape of the light guide 50a and the arrangement thereof are modified as compared with those of the radiation detecting apparatus of the tenth embodiment.

That is, in this structure, the light guide 50a is arranged so as to be away from the back surface of the second scintillator 15 at a predetermined interval and an air exists in the case 13 so that an air layer 51 is formed between the back surface of the second scintillator 15 and the top opening surface of the light guide 50a.

The bottom surface of the light guide 50a is formed with one aperture 52a1 and other aperture 52a2 is formed on one edge portion of the peripheral wall on the longitudinal edge side of the second scintillator 15.

The first filter 46a of the first photo-detector 45a is buried in the aperture 52a1 so that the first filter 46a is arranged so as to be away from the back surface of the second scintillator 15 at the distance between the back surface thereof and the bottom surface of the light guide 50a.

Incidentally, other structures of the radiation detecting apparatus 11J of this eleventh is substantially the same as the structures of the radiation detecting apparatus 11C of the fourth embodiment, and therefore, the descriptions about the other structures of the radiation detecting apparatus 11J are omitted.

In this structure, similarly to the above embodiments, because the second scintillator 15 is surrounded by the air layer 51, the light L2 emitted in the second scintillator 15 is totally internally reflected on the surrounding air layers 27 and 30 so as to be diffused in the second scintillator 15 while being captured therein.

Therefore, the emitted light L2 does not pass on the first filter 46a of the first photo-detector 45a so that the emitted light L2 is efficiently propagated to be ideally incident into the second filter 46b without any influence of the first filter 46a.

In addition, because the opening top surface of the light guide 50a has wide area and the aperture 52a1 of the bottom surface of the light guide 50a is narrowed sufficiently to fit the first filter 46a to the aperture 52a1, the lights emitted from the first and second scintillators 14 and 15 are effectively guided and condensed to the first filter 46a of the first photo-detector 45a so that the only light emitted from the first scintillator 14 is selected by the first filter 46a to be transmitted therethrough so that the light emitted from the first scintillator 14 is detected by the photo-detector 45a.

As described above, in this embodiment, it is possible to ideally condense the light emitted in the second scintillator 15 by the total internal reflection, and to increase a quantity of the emitted light from the first scintillator 14 which is condensed on the first filter 46a.

Figure 12:
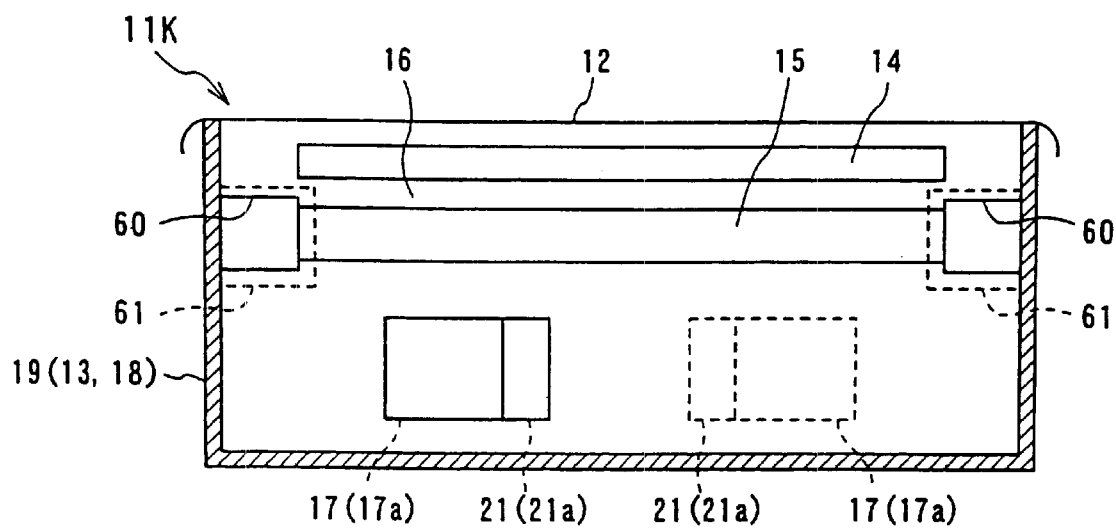
FIG. 12 is an elevational view partially in section showing a radiation detecting apparatus according to a twelfth embodiment of the present invention.

Twelfth embodiment (FIG. 12)

Figure 13:
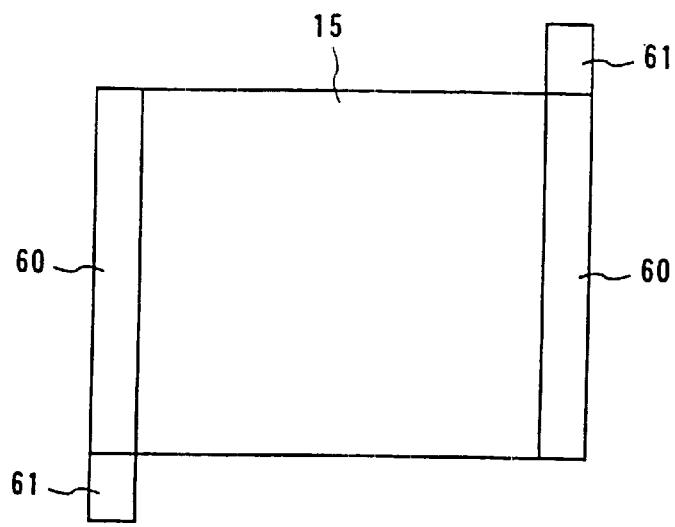
FIG. 13 is a plan view showing a second scintillator in FIG. 12.

FIG. 12 is an elevational view partially in section showing a radiation detecting apparatus according to a twelfth embodiment of the present invention. FIG. 13 is a plan view showing a second scintillator in FIG. 12.

In this twelfth embodiment, similar to the third embodiment, the radiation detecting apparatus 11K includes the condensing box 19 used as the case 13, and one incident side of the condensing box 19 is mounted with the light shielding film 12 capable of transmitting therethrough an α ray and a β ray while shielding light from the outside. The first and second scintillators 14 and 15 are arranged on an inside of the light shielding film 12 so that the air layer 16 is interposed therebetween.

In the condensing box 19, two photo-detectors 17 (first photo-detectors 17a) are arranged on the backside of the second scintillator 15.

Each of the photo-detectors 17(17a) is provided with the filter 21(21a) adapted to selectively transmit therethrough only light emitted from the first scintillator 14 without sensing the light emitted in the second scintillator 15.

On the other hand, the second scintillator 15 is provided at both lateral side edges with fluorescence converting light guides 60 so that the light emitted in the second scintillator 15 is condensed by using a fluorescence converting effect of the fluorescence converting light guide 60 of the second scintillator 15.

That is, as shown in FIG. 12 and FIG. 13, to the lateral side edge portions of the second scintillator 15 the fluorescence converting light guides 60 are attached, and each one lateral end of each of the fluorescence converting light guides 60 is provided with a photo-detector 61. The fluorescence converting light guide 60 is formed by adding a fluorescent substance to a resin or the like, and has an effect of absorbing a scintillation light emitted in the second scintillator 15 and re-emitting a light (fluorescence) having a longer wavelength. Moreover, the fluorescence converting light guide 60 may be formed of a fiber made by adding the fluorescent substance to a core, (that is, a fluorescent fiber, a wavelength shift fiber, etc.), and is able to be used in accordance with its diameter and a joining method or the like.

Incidentally, other structures of the radiation detecting apparatus 11K of this twelfth embodiment is substantially the same as the structures of the radiation detecting apparatus 11B of the third embodiment, and therefore, the descriptions about the other structures of the radiation detecting apparatus 11K are omitted.

According to the aforesaid structure, the air layer 16 is interposed between the first and second scintillators 14 and 15, and the first scintillator 14 is, for example, composed of a powder or sintered body. Thus, a diffuse reflection is made in the second scintillator 15 itself so that the light is emitted outside. Therefore, the light emitted from the first scintillator 14 is once transmitted through the second scintillator 15, and thereafter, is filled in the condensing box 19, and thus, is detected by means of the photo-detector 17 arranged in the condensing box 19. A component of the light from the second scintillator 15 is incident in the condensing box 19; however, the incident light in the condensing box 19 is eliminated by means of the filter 21 provided on the photo-detector 17.

The surrounding of the second scintillator 15 is surrounded with an air so that a confinement effect of the light emitted in the second scintillator 15 is caused by the total internal reflection therein. As a result, half components or more of the emitted light in the second scintillator 15 are condensed on the lateral edge portion side of the second scintillator 15 with a high density. Since the fluorescence converting light guide 60 is arranged on the lateral edge portion side of the second scintillator 15, and in the fluorescence converting light guide 60, the light emitted in the second scintillator 15 is totally internally reflected in the light guide 60 while being guided therein so as to be converted (re-emitted) into the fluorescence light.

As a result, it is possible to detect the re-emitted fluorescence light by means of the photo-detector 61 provided on the lateral end surface of the light guide 60.

In the aforesaid condensing system on the lateral edge side of the second scintillator 15, the light emitted in the second scintillator 15 is condensed without greatly depending upon an area of the scintillator so that it is possible to apply this condensing system to a large-area scintillator together with the condensing box 19.

In this twelfth embodiment, as described above, the first and second scintillators are made into a two-layer structure so that there is no need of measuring pulse height distributions and carrying out a waveform discrimination, making it possible to simultaneously and independently measure the α ray and the β ray with the use of the difference in their wavelengths, and to provide a radiation detecting apparatus including scintillators each having still more large area.

Although not illustrated, the entire peripheral edges of the second scintillator 15 may be provided with the fluorescence converting light guide 60, in addition to parallel two lateral side edges of the second scintillator 15. Machining may be carried out with respect to no-use end of the fluorescence converting guide 60 and two longitudinal side edges which are provided with no light guide 60 of the second scintillator 15 so as to a mirror reflection and a diffuse reflection. By the aforesaid structures of the modifications, it is possible to improve an efficiency of using the light.

Figure 14:
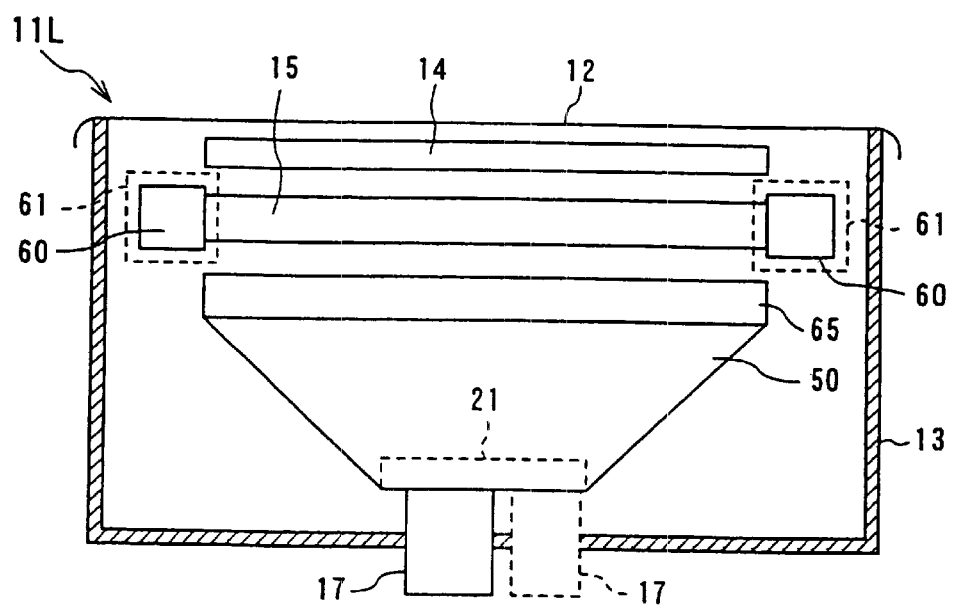
FIG. 14 is an elevational view partially in section showing a radiation detecting apparatus according to a thirteenth embodiment of the present invention.

Thirteenth Embodiment (FIG. 14)

FIG. 14 is an elevational view partially in section showing a radiation detecting apparatus according to a thirteenth embodiment of the present invention.

In this thirteenth embodiment, the first and second scintillators 14 and 15 of the radiation detecting apparatus 11L are arranged on one side of a non-reflection type case 13 so that the air layer 16 is interposed therebetween. In the case 13, a fluorescent screen 65 is located on a position where the light emitted from the first scintillator 14 transmitting through the second scintillator 15 is capable of being incident. The fluorescent screen 65 is provided with the photo-detector 17 (17a) which closely couples therewith. The photo-detector 17 is provided with the filter 21 (21a) for shielding a component of light emitted from the second scintillator 15, which is incident upon the light guide 50.

Incidentally, an air layer is interposed between the second scintillator 15 and the fluorescent screen 65. Moreover, like the twelfth embodiment, at lateral edge portions, the second scintillator 15 is provided with fluorescence converting light guides 60 and the photo-detectors 61, respectively, and thus, the condensing structure by the fluorescence conversion according to the twelfth embodiment is employed on the lateral edge portion sides of the second scintillator 15.

Incidentally, other structures of the radiation detecting apparatus 11L of this thirteenth embodiment is substantially the same as the structures of the radiation detecting apparatus 11I of the tenth embodiment, and therefore, the descriptions about the other structures of the radiation detecting apparatus 11L are omitted.

In this structure, the light emitted from the first scintillator 14 transmits through the second scintillator 15, and then, is incident upon the fluorescent screen 65, and thus, converted into a fluorescence light so that the converted fluorescence light are emitted therein. The emitted fluorescence light is incident upon the light guide 50 provided so as to be closely coupled with the fluorescent screen 65, and then, reaches the photo-detector 17 so as to be detected hereto. Moreover, the light emitted in the second scintillator 15 is detected by means of the fluorescence converting light guide 60 provided on each lateral edge side portion of the second scintillator 15 and the photo-detector 61 attached to each lateral end portion of the light guide 61.

According to this thirteenth embodiment, as described above, the first and second scintillators are made into a two-layer structure so that there is no need of measuring pulse height distributions and carrying out a waveform discrimination, making it possible to simultaneously and independently measure the α ray and the β ray with the use of the difference in their wavelengths, and to make compact the size of the photo-detector 17 to be used, thereby making the size of the radiation detecting apparatus compact.

Incidentally, the fluorescent screen 65 may be formed into the same shape as the light guide 50 so as to dispense the light guide 50.

Figure 15:
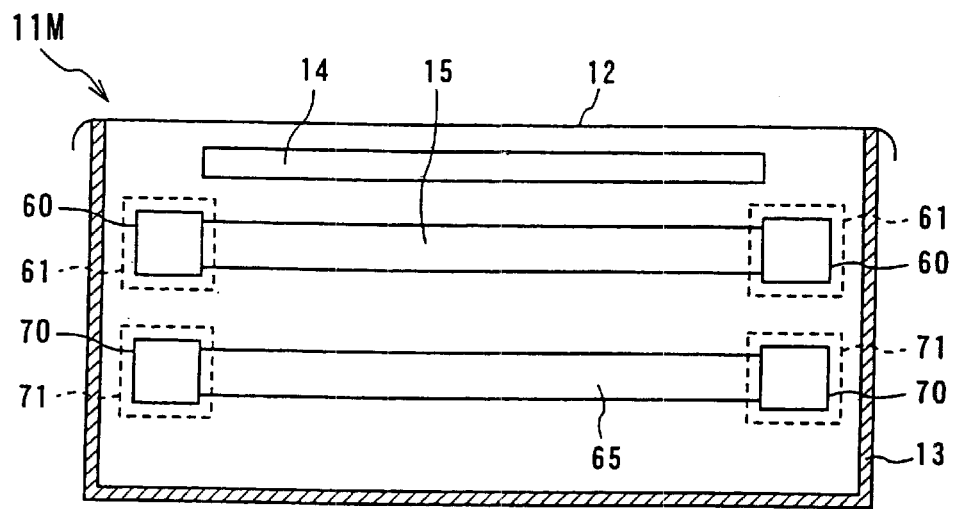
FIG. 15 is an elevational view partially in section showing a radiation detecting apparatus according to a fourteenth embodiment of the present invention.

Fourteenth Embodiment (FIG. 15)

FIG. 15 is an elevational view partially in section showing a radiation detecting apparatus according to a fourteenth embodiment of the present invention.

In this fourteenth embodiment, similar to the above thirteenth embodiment, the first and second scintillators 14 and 15 of the radiation detecting apparatus 11M are arranged on one side of a non-reflection type case 13 so that the air layer 16 is interposed therebetween. The second scintillator 15 is provided at each lateral edge portion with the fluorescence converting light guide 60 and the photo-detector 61, and thus, the condensing structure by the fluorescence conversion is employed on each lateral edge portion side of the second scintillator 15.

Moreover, the fluorescent screen 65 is located on a position where the light emitted from the first scintillator 14 transmitting through the second scintillator 15 is capable of being incident.

The fluorescent screen 65 is provided at each lateral edge portion side with a second light guide 70 and a photo-detector 71, similar to each lateral edge portion side of the second scintillator 15, and thus, the condensing structure by the fluorescence conversion is employed on each lateral edge portion side of the second light guide 70. That is, the light emitted from the first scintillator 14 is converted into the a first fluorescence light in the fluorescent screen 65, and further, the first fluorescence light is doubly converted into a second fluorescence light having a longer wavelength as compared with the first fluorescence light on each lateral edge side of the fluorescent screen 65.

In this case, a fluorescent substance contained in the second fluorescence converting light guide 70 for the fluorescent screen 65 is different from that used for the second scintillator 15. Namely, a fluorescent substance is selectively applied to the second scintillator 15 and the fluorescent screen 65. That is, the second scintillator 15 includes a fluorescent substance, which absorbs a light from the second scintillator 15 and converts it into a fluorescence light, and the fluorescent screen 65 includes a fluorescent substance which is capable of absorbing a fluorescence light from the fluorescent screen 65 and converting it into a fluorescence light having a longer wavelength as compared with the fluorescence light converted by the second scintillator 15.

Incidentally, other structures of the radiation detecting apparatus 11M of this fourteenth embodiment is substantially the same as the structures of the radiation detecting apparatus 11L of the thirteenth embodiment, and therefore, the descriptions about the other structures of the radiation detecting apparatus 11M are omitted.

With the above structure, the light radiated into an air from the first scintillator 14 and incident upon the second scintillator 15 is not substantially captured in the second scintillator 15. In addition, in the case where the light emitted from the first scintillator 14 is directly incident upon the fluorescence converting light guide 60 provided on the second scintillator 15, because an absorbed wavelength band of the light guide 60 is different from the incident light emitted from the first scintillator 14. Therefore, no fluorescence signal is generated as an error signal by the photo-detector 17.

According to this fourteenth embodiment, as described above, the first and second scintillators are made into a two-layer structure so that there is no need of measuring pulse height distributions and carrying out a waveform discrimination, making it possible to simultaneously and independently measure the α ray and the β ray with the use of the difference in their wavelengths.

In addition, because the light emitted from the first scintillator is condensed on each lateral edge portion of the fluorescent screen 65, it is possible to make the width of the radiation detecting apparatus thin and to increase the area thereof.

Figure 16:
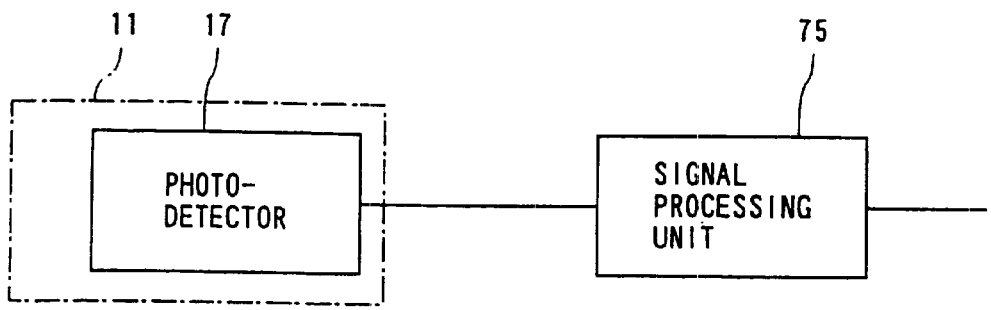
FIG. 16 is a view schematically showing a radiation detecting system according to a fifteenth embodiment of the present invention.

Fifteenth Embodiment (FIG. 16)

This fifteenth embodiment relates to a radiation detecting system having one of the radiation detecting apparatuses described in the above first to fourteenth embodiments, and FIG. 16 is a view schematically showing a structure of the radiation detecting system. Incidentally, in this embodiment, for example, the radiation detecting system includes the radiation detecting apparatus 11 described in the first embodiment. Incidentally, other radiation detecting apparatuses 11A~11M are able to be used in the radiation detecting system according to the fifteenth embodiment, as in the case of using the radiation detecting apparatus 11.

As shown in FIG. 16, in this fifteenth embodiment, a signal outputted from the photo-detector 17 of the radiation detecting apparatus 11 is processed by means of a pulse height discrimination unit 75 as a signal processing unit. More specifically, in the case where at least one of the photo-detector 17 corresponding to each of the aforesaid scintillators constituting a two-layer structure, the signal outputted from the photo-detector 17 is inputted in the pulse height discrimination unit 75.

The pulse height discrimination unit 75 recognizes a pulse signal having a predetermined pulse height value or more as the signal corresponding to the light from the first or second scintillator according to the inputted signal so as to carry out a process of eliminating a signal less than the predetermined pulse height value as a noise.

According to this fifteenth embodiment, only when a signal more than a dark current noise of the photo-detector 17 is transmitted to the pulse height discrimination unit 75, it is possible to recognize the signal corresponding to the light from the first or second scintillator by the pulse height discrimination unit 75.

Figure 17:
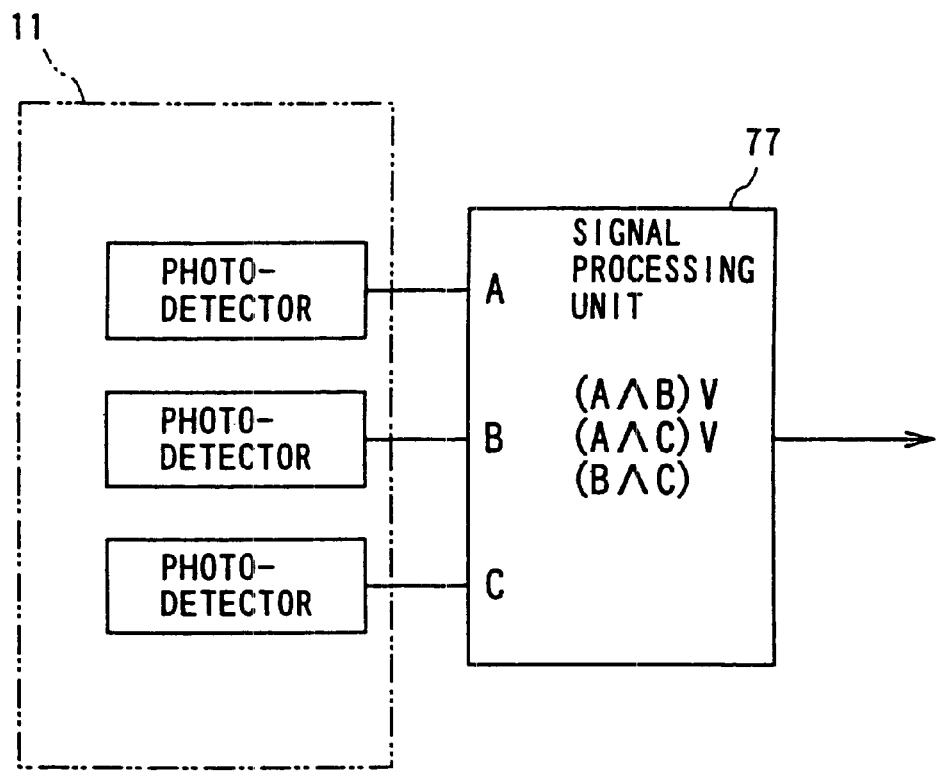
FIG. 17 is a view schematically showing a radiation detecting system according to a sixteenth embodiment of the present invention.

Sixteenth Embodiment (FIG. 17)

This sixteenth embodiment relates to a radiation detecting system having one of the radiation detecting apparatuses described in the above first to fourteenth embodiments, and FIG. 17 is a view schematically showing a structure of the radiation detecting system. Incidentally, in this embodiment, for example, the radiation detecting system includes the radiation detecting apparatus 11 described in the first embodiment. Incidentally, other radiation detecting apparatuses 11A~11M are able to be used in the radiation detecting system according to the sixteenth embodiment, as in the case of using the radiation detecting apparatus 11.

In this sixteenth embodiment, signals outputted from the plurality of photo-detectors 17 are processed by means of a signal processing unit 77. More specifically, in the case where the plurality of the photo-detectors 17 corresponding to each of the scintillator having a two-layer structure are used, or in the case of adding each signal from each photo-detector, an analog adder having a band capable of amplifying a signal is required. However, by using the signal processing unit 77 for detecting an establishment of a logic product by using logic signals corresponding to the detected signals of the photo-detectors 17, it is possible to easily discriminate the signals corresponding to the lights from each of the first and second scintillators except for the noises.

As shown in FIG. 17, for example, in the case where three signals A, B and C outputted from the photo-detectors 17 corresponding to each scintillator are inputted in the signal processing unit 77, the signal processing unit 77 executes the logic product by using any two inputted signals of them, and, when the logic product is established, the signal processing unit 77 discriminates the signals A, B and C as the signals corresponding to the lights from the first and second scintillators.

According to this sixteenth embodiment, employing the aforesaid system, it is possible to eliminate mutually non-correlative dark current noises generated in the photo-detectors 17 so as to extract only the signals corresponding to the lights from the first and second scintillators.

Figure 18:
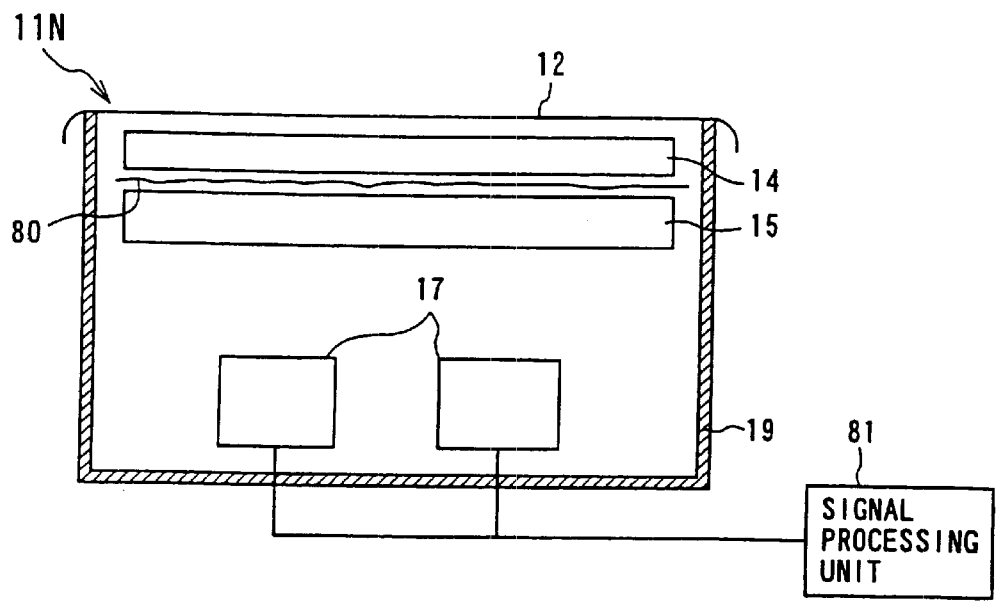
FIG. 18 is a view showing a radiation detecting system according to a seventeenth embodiment of the present invention.

Seventeenth Embodiment (FIG. 18)

FIG. 18 is a view showing a radiation detecting system according to a seventeenth embodiment of the present invention.

In this seventeenth embodiment, the radiation detecting system comprises a radiation detecting apparatus 11N having a substantially the same structure of the radiation detecting apparatus 11 without having the condensing unit 18.

That is, the radiation detecting apparatus 11N is provided with the two kinds of scintillators 14 and 15 having the different emission center wavelengths with each other, and with the condensing box 19 having a reflecting inner surface. On a radiation incident side of the condensing box 19, the light shielding film 12 is provided. The light shielding film 12 is capable of transmitting therethrough an α ray and a β ray and shielding light from the outside. The first and second scintillators 14 and 15 are arranged on the inside of the light shielding film 12 in the condensing box 19.

The lights emitted from the first and second scintillators 14 and 15 are mixed to be filled in the condensing box 19. In the example shown in FIG. 18, two photo-detectors 17 are arranged in the condensing box 19, and the photo-multiplier tube is used as each photo-detector 17.

In this embodiment, the radiation detecting apparatus 11N also comprises an optical attenuation filter 80 interposed between the first and second scintillators 14 and 15. The same material as the light shielding film 12 may be used as a material capable of attenuating light and transmitting therethrough a β ray. For example, a thickness of the aluminum focused on a thin polyester film is adjusted to apply to the material of the optical attenuation filter 80. An air layer may be interposed between the first scintillator 14 and the optical attenuation filter 80 and between the second scintillator 15 and the same, and these components may be optically closely adhered with each other.

Signals outputted from the photo-detectors 17 are adapted to be inputted to a signal processing unit 81.

With the above structure, by the optical attenuation filter 80, the light emitted from the first scintillator 14 based on the α ray is attenuated to be filled in the condensing box 19. In this case, the light emitted from the second scintillator 15 is not attenuated and weakened.

The signals outputted from the photo-detectors 17 are inputted in the signal processing unit 81. The signals inputted in the signal processing unit 81 are individually processed, or added, or gated by the simultaneous counting information so as to extract the signals corresponding to the lights from the first and second scintillators 14 and 15 except for noises.

Then, according to the extracted signals, the signal processing unit 81 discriminates between the signal corresponding to the emitted light from the first scintillator 14 on the basis of the α ray, and the signal corresponding to the emitted light from the second scintillator 15 on the basis of the β ray.

That is, conventionally, because a signal level based on the α ray is high, in the waveform discrimination process for optimizing the signal level, a sensitivity relating to the β ray has not sufficiently been obtained. However, according to this seventeenth embodiment, a quantity of light emitted from the first scintillator 14 corresponding to the α ray is adjusted through the optical attenuation filter 81 so that it is possible to optimize and use an input voltage range in the signal processing unit 81 for discriminating a waveform.

Figure 19:
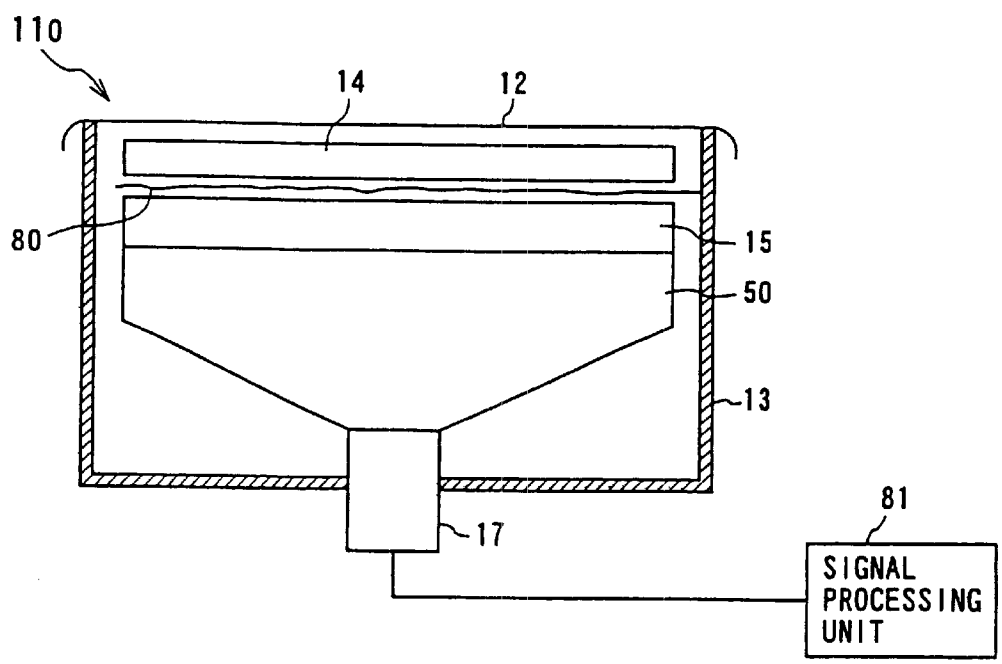
FIG. 19 is a view showing a radiation detecting system according to an eighteenth embodiment of the present invention.
Figure 20:
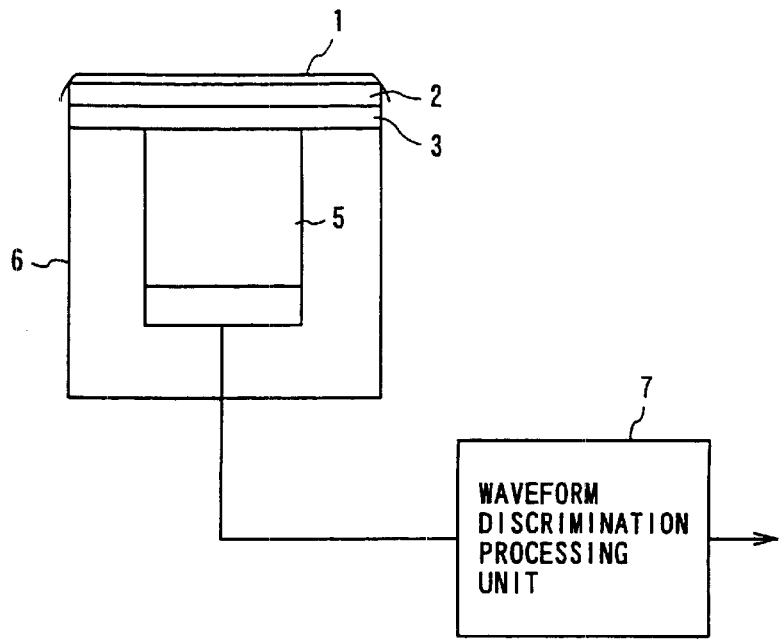
FIG. 20 is a view showing a phoswich detecting apparatus as a conventional example of a radiation detecting apparatus.
Figure 21:
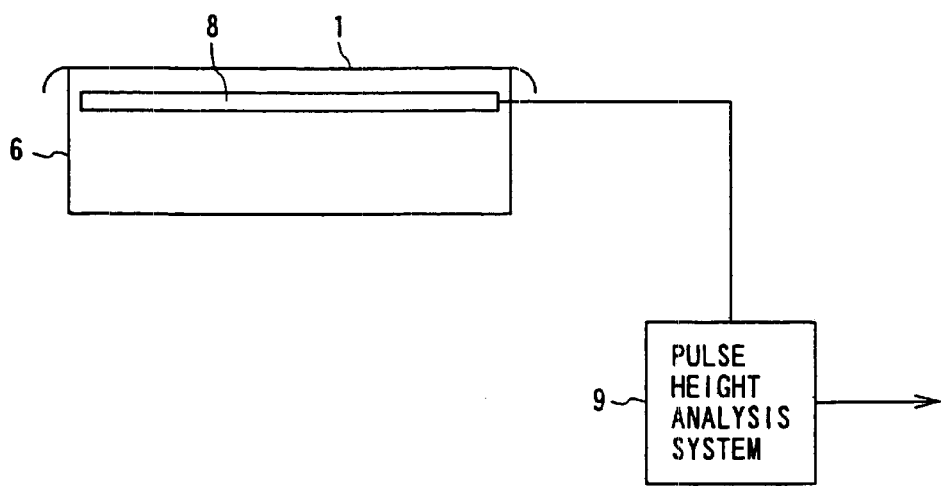
FIG. 21 is a view showing, as another conventional example, an α-β rays detecting apparatus.

Eighteenth Embodiment (FIG. 19)

FIG. 19 is a view showing a radiation detecting system according to an eighteenth embodiment.

In this eighteenth embodiment, the radiation detecting system comprises a radiation detecting apparatus 11O having a substantially the same structure of the radiation detecting apparatus 11L except that the photo-detector 17 is single.

In this eighteenth embodiment, the optical attenuation filter 80 is interposed between the first and second scintillators 14 and 15, and the light guide 50 is arranged so as to closely be coupled with the second scintillator 15. Furthermore, the light guide 50 is closely be coupled with the photo-detector 17.

With the above construction, by the optical attenuation filter 80, the light emitted from the first scintillator 14 based on the α ray is attenuated to be filled in the light guide 50. Therefore, in this eighteenth embodiment, similar to the seventeenth embodiment, a quantity of light emitted from the first scintillator 14 corresponding to the α ray is adjusted through the optical attenuation filter 81 so that it is possible to optimize and use an input voltage range in the signal processing unit 81 for discriminating a waveform.

While there has been described what is at present considered to be the preferred embodiments and modifications of the present invention. It will be understood that various modifications which are not described yet may be made therein, and it is intended to cover in the appended claims all such modifications as fall within the true spirit and scope of the invention.

What is claimed is:

1. A radiation detecting apparatus comprising:

a light shielding film for transmitting therethrough first and second radiation rays while shielding out other light;

a first scintillator for emitting a first light in response to the first radiation ray transmitted through the light shielding film, said first scintillator emitting the first light having a first emission center wavelength determined based on the first radiation ray, wherein the first emission center wavelength is a wavelength of the first light emitted in the first scintillator and having a peak emission intensity in an emission wavelength band of the first scintillator;

a second scintillator for emitting a second light in response to the second radiation ray transmitted through the light shielding film, said second scintillator emitting the second light having a second emission center wavelength that is different than said first emission center wavelength and is determined based on the second radiation ray, wherein the second emission center wavelength is a wavelength of the second light emitted in the second scintillator and having a peak emission intensity in an emission wavelength band of the second scintillator; and detection means having at least one photo-detector for detecting the first light emitted from the first scintillator and the second light emitted in the second scintillator, wherein said second scintillator has an incident surface on which the first and second radiations are incident and a back surface opposite to the incident surface, said detection means comprises first and second photo-detectors each having a sensitive surface sensitive to each of the first and second lights; a first filter mounted on the sensitive surface of the first photo-detector; and a second filter mounted on the sensitive surface of the second photo-detector, said first filter being adapted to transmit therethrough only the fist light emitted from the first scintillator, said second filter being adapted to transmit therethrough only the second light emitted in the second scintillator, and wherein said first filter is arranged to be away from the back surface of the second scintillator at a predetermined interval so that an air layer is interposed between the back surface of the second scintillator and the first filter, and said second filter is closely optically adhered on the back surface of the second scintillator.

2. A radiation detecting apparatus comprising:

a light shielding film for transmitting therethrough first and second radiation rays while shielding out other light;

a first scintillator for emitting a first light in response to the first radiation ray transmitted through the light shielding film, said first scintillator emitting the first light having a first emission center wavelength determined based on the first radiation ray, wherein the first emission center wavelength is a wavelength of the first light emitted in the art scintillator and having a peak emission intensity in an emission wavelength band of the first scintillator;

a second scintillator for emitting a second light in response to the second radiation ray transmitted through the light shielding film, said second scintillator emitting the second light having a second emission center wavelength that is different than said first emission center wavelength and is determined based on the second radiation ray, wherein the second emission center wavelength is a wavelength of the second light emitted in the second scintillator and having a peak emission intensity in an emission wavelength band of the second scintillator; and detection means having at least one photo-detector for detecting the first light emitted from the first scintillator and the second light emitted in the second scintillator, wherein said second scintillator has an incident surface on which the first and second radiations are incident and a back surface opposite to the incident surface, said detection means comprises first and second photo-detectors each having a sensitive surface sensitive to each of the first and second lights; a first filter mounted on the sensitive surface of the first photo-detector; and a second filter mounted on the sensitive surface of the second photo-detector, said first filter being adapted to transmit therethrough only the first light emitted from the first scintillator, said second filter being adapted to transmit therethrough only the second light emitted in the second scintillator, and wherein said first filter is arranged to be away from the back surface of the second scintillator at a predetermined interval, and said second filter is closely optically adhered on the back surface of the surface of the second scintillator, further comprising a surrounding box having an inner surface portion for surrounding a back surface side of the second scintillator so as to form a closed space therein, said back surface of the second scintillator and said first filter forming parts of the inner surface portion of the surrounding box, said inner surface portion of the surrounding box except for the back surface of the second scintillator and the first filter being processed to totally internally reflect diffusely the first light emitted from the first scintillator.

3. A radiation detecting apparatus according to claim 2, wherein said inner surface portion comprises a plurality of inner surfaces, each of said inner surfaces is inclined so that the diffusely reflecting directions on average of the first light on the inner surfaces of the surrounding box are substantially directed to a position of the second scintillator at which a center axis of the sensitive surface of the first photo-detector is crossed.

4. A radiation detecting apparatus comprising:

a light shielding film for transmitting therethrough first and second radiation rays while shielding out other light;

a first scintillator for emitting a first light in response to the first radiation ray transmitted through the light shielding film, said first scintillator emitting the first light having a first emission center wavelength determined based on the first radiation ray, wherein the first emission center wavelength is a wavelength of the fist light emitted in the first scintillator and having a peak emission intensity in an emission wavelength band of the first scintillator;

a second scintillator for emitting a second light in response to the second radiation ray transmitted through the light shielding film, said second scintillator emitting the second light having a second emission center wavelength that is different than said first emission center wavelength and is determined based on the second radiation ray, wherein the second emission center wavelength is a wavelength of the second light emitted in the second scintillator and having a peak emission intensity in an emission wavelength band of the second scintillator; and detection means having at least one photo-detector for detecting the first light emitted from the first scintillator and the second light emitted in the second scintillator, wherein a first filter is arranged to be away from a back surface of the second scintillator opposed to light incident surface of said second scintillator at a predetermined interval, and a second filter is closely optically adhered on the back surface of the second scintillator, and wherein a light guide is positioned with an opening surface opposite to the back surface of the second scintillator, said light guide being arranged so that the opening surface thereof is away from the back surface of the second scintillator at a predetermined interval so as to interpose an air layer between the opening surface of the light guide and the back surface of the second scintillator, said opening surface thereof having an area which is larger than that of the first filter.

* * * * *